(12) United States Patent
Okabe et al.

(10) Patent No.: US 8,669,339 B2
(45) Date of Patent: Mar. 11, 2014

(54) POLYBUTADIENE, MODIFIED POLYBUTADIENE, METHOD FOR PRODUCING BOTH, AND RUBBER-REINFORCED STYRENE RESIN COMPOSITION USING SAME

(75) Inventors: Yasuyoshi Okabe, Ichihara (JP); Yuuji Matsudaira, Ichihara (JP); Chaiyaket Vichuta, Tambol Tapong Muang Rayong District Rayong Province (TH); Toshiyuki Sakaguchi, Ichihara (JP)

(73) Assignee: Ube Industries, Ltd. (JP)

( * ) Notice: Subject to any disclaimer, the term of this patent is extended or adjusted under 35 U.S.C. 154(b) by 0 days.

(21) Appl. No.: 13/579,531

(22) PCT Filed: Feb. 21, 2011

(86) PCT No.: PCT/JP2011/053753
§ 371 (c)(1),
(2), (4) Date: Aug. 28, 2012

(87) PCT Pub. No.: WO2011/102518
PCT Pub. Date: Aug. 25, 2011

(65) Prior Publication Data
US 2012/0309902 A1    Dec. 6, 2012

(30) Foreign Application Priority Data

| Feb. 19, 2010 | (JP) | 2010-035221 |
| Feb. 19, 2010 | (JP) | 2010-035224 |
| Feb. 19, 2010 | (JP) | 2010-035226 |
| Jan. 28, 2011 | (JP) | 2011-016141 |
| Jan. 28, 2011 | (JP) | 2011-016142 |
| Feb. 1, 2011 | (JP) | 2011-019495 |
| Feb. 1, 2011 | (JP) | 2011-019496 |
| Feb. 10, 2011 | (JP) | 2011-027222 |
| Feb. 10, 2011 | (JP) | 2011-027240 |
| Feb. 10, 2011 | (JP) | 2011-027250 |
| Feb. 10, 2011 | (JP) | 2011-027258 |

(51) Int. Cl.
*C08F 136/06* (2006.01)
*C08F 136/00* (2006.01)
*C08F 2/38* (2006.01)

(52) U.S. Cl.
USPC ........... 526/340.4; 525/332.8; 525/333.1; 525/333.2; 525/331.9; 526/82; 526/84; 526/335; 526/340.1; 526/340.2

(58) Field of Classification Search
USPC ........ 525/332.8, 333.1, 333.2, 331.9; 526/82, 526/84, 335, 340.1, 340.2, 340.4
See application file for complete search history.

(56) References Cited

U.S. PATENT DOCUMENTS

| 3,236,827 | A | * | 2/1966 | Scott et al. ............... 526/191 |
| 4,579,920 | A | | 4/1986 | Tsujimoto et al. |
| 5,731,381 | A | * | 3/1998 | Apecetche et al. ......... 526/83 |
| 5,981,667 | A | * | 11/1999 | Asakura et al. ............ 525/316 |

FOREIGN PATENT DOCUMENTS

| EP | 1162231 A2 | 12/2001 |
| EP | 1443078 A1 | 8/2004 |
| EP | 1693411 A1 | 8/2006 |
| EP | 1780051 A1 | 5/2007 |
| EP | 2028196 A1 | 2/2009 |
| JP | 09-291108 | 11/1997 |
| JP | 09-302035 | 11/1997 |
| JP | 09-324009 | 12/1997 |
| JP | 10-139835 | 5/1998 |
| JP | 10-152535 | 6/1998 |
| JP | 10-218949 | 8/1998 |
| JP | 10-273509 | 10/1998 |
| JP | 10-273574 | 10/1998 |
| JP | 2002-302512 | 10/2002 |
| JP | 2003-277569 | 10/2003 |
| JP | 2004-250669 | 9/2004 |
| JP | 2007-023232 | 2/2007 |

* cited by examiner

*Primary Examiner* — Robert C Boyle
(74) *Attorney, Agent, or Firm* — Clark Hill PLC

(57) ABSTRACT

Disclosed are a polybutadiene having a controlled microstructure, a narrow molecular weight distribution, minimal gel content, and a low APHA color, a modified polybutadiene, producing methods for both, and a rubber-reinforced styrene resin composition using the same. The polybutadiene of the present invention is characterized in that the ratio (Tcp/$ML_{1+4}$) of a 5% toluene melting viscosity (Tcp) measured at 25° C. and the Mooney viscosity ($ML_{1+4}$) at 100° C. is 2.0 or higher, the molecular weight distribution (Mw/Mn) is 2.80 or less, the gel content is 0.06 wt % or less, and the APHA color is 20 or less.

6 Claims, 6 Drawing Sheets

POLYBUTADIENE, MODIFIED POLYBUTADIENE, METHOD FOR PRODUCING BOTH, AND RUBBER-REINFORCED STYRENE RESIN COMPOSITION USING SAME

RELATED/PRIORITY APPLICATION

This application is a National Phase filing regarding International Application No, PCT/JP2011/053753, filed on Feb. 21, 2011, which relies upon the following Japanese Patent applications for priority: Japanese Patent Application No, 2010-035221, filed on Feb. 19, 2010; Japanese Patent Application No, 2010-035224, filed. on Feb. 19, 2010; Japanese Patent Application No, 2010-035226, filed on Feb. 19, 2010; Japanese Patent Application No. 2011-016141, filed on Jan. 28, 2011; Japanese Patent Application No. 2011-016142, filed. on Jan. 28, 2011; Japanese Patent Application No. 2011-019495, filed on Feb. 1, 2011; Japanese Patent Application No. 2011-019496, filed on Feb. 1, 2011; Japanese Patent Application No, 2011-027222, filed on Feb. 10, 2011; Japanese Patent Application No 2011-027240, filed on Feb. 10, 2011; Japanse Patent Application No, 2011-027250, filed on Feb. 10, 2011; and Japanese Patent Application No, 2011-027258, filed on Feb. 10, 2011.

TECHNICAL FIELD

The present invention relates to a polybutadiene and a modified polybutadiene having a controlled microstructure, linearity, a molecular weight distribution, gel content, and a APHA color, a method for producing the both, and a rubber-reinforced styrene resin composition using the same.

BACKGROUND ART

Polybutadiene has a so-called microstructure in which a bonding portion formed by polymerization of 1, 4-position (1,4-structure) and a bonding portion formed by polymerization of 1,2-position (1,2-structure) are concurrently exist in a molecular chain. The 1,4-structure is classified into two types, namely cis structure and trans structure. On the other hand, the 1,2-structure has a vinyl group as a side chain.

It has been known that various polybutadienes having different microstructures are produced using a polymerization catalyst. Those polybutadienes are used for various purposes depending on their properties. In particular, polybutadiene having a high molecular linearity is excellent in wear resistance, heat resistance, and impact resilience. A ratio Tcp/$ML_{1+4}$, which is a ratio of a viscosity of 5% toluene solution measured at 25° C. (Tcp) to Mooney viscosity measured at 100° C. ($ML_{1+4}$), is used as a index of the linearity, Tcp represents a degree of entanglement of molecules in a dense solution. As Tcp/$ML_{1+4}$ is larger, branching degree of polybutadiene is smaller and linearity of polybutadiene is larger.

As disclosed in Patent documents 1 to 3, it has been found that polybutadiene having the microstructure, which includes high cis structure, moderate amount of 1,2-structure, and small amount of trans structure, and thus having high linearity, can be produced by using a polymerization catalyst consisting of metallocene type complex of vanadium metal compound, ionic compound of non-coordinate anion and cation, and/or aluminoxane. It is considered that this polybutadiene is applied to a nigh-impact polystyrene resin and a tire because of its excellent properties. However, since a polymerization inhibitor does not speedily diffuse to the polybutadiene solution because of high viscosity of the polybutadiene solution induced by high linearity, deactivation of the polymerization catalyst is delayed to promote a side reaction of the polymerisation catalyst and antioxidant. As a result, chromogenic development of polybutadiene occurs and APHA color on a solution state becomes high. Since the rubber-reinforced polystyrene resin composition produced by using the polybutadiene occurs yellow discoloration when the APHA color is high, high APHA color is not preferred.

Further, since polybutadiene has a relatively high cold flow, there are some cases where the polybutadiene is demanded to improve on the occasion, of storage and transfer. For that reason, it has been found that the properties such as a cold flow can be improved by modifying the polybutadiene in the presence of a metal catalyst, in order to resolve the problems on the occasion of storage and transfer of polybutadiene having the microstructure which includes high cis structure, moderate amount, of 1,2-structure, and small amount of trans structure, and thus high linearity (Patent document 4).

On the other hand, acrylonitrile-butadiene-styrene copolymer (ABS polymer) obtained by radical polymerization of styrene monomer containing polybutadiene added thereto, is widely known as a high-impact polystyrene resin. For example, Patent document 5 discloses a high-impact polystyrene resin, in which high cis and high vinyl BR is used. The high cis and high vinyl BR has 65-95% of cis-1,4-structure and 4-30% of 1,2-structure and produced using a metallocene catalyst.

Furthermore, butadiene-styrene copolymer (HIPS polymer) obtained by radical polymerization of styrene monomer containing polybutadiene added thereto, is widely known as a high-impact polystyrene resin. For example, Patent documents 10-13 disclose a high-impact polystyrene resin, in which high cis and high vinyl BR is used, as a modifying agent for rubber. The high cis and high vinyl BR has 65-95% of cis-1,4-structure and 4-30% of 1,2-structure and produced using a metallocene catalyst. The rubbers described in these documents are modified to improve a cold flow property, and the obtained polymer is reported as HIPS polymer (Patent document 6).

PRIOR DOCUMENT

Patent Document

Patent document 1: JP A-9-291108
Patent document 2: JP A-9-324009
Patent document 3: JP A-9-302035
Patent document 4: JP 3.982203
Patent document 5: JP A-10-273509
Patent document 6: JP A-2004-250669
Patent document 7: JP A-10-139835
Patent document 8: JP A-10-152535
Patent document 9: JP A-10-218949
Patent document 10: JP A-10-273574

DISCLOSURE OF THE INVENTION

Problems to be Solved by the Invention

However, in the polybutadienes described in Patent documents 1-3, since polymerization is terminated in an ordinary polymerization terminating condition, there is a problem that they have high APHA color. Further, in the polybutadienes described in Patent document 4, there is a problem that they have a wide molecular weight distribution, much gel content, and a high APHA color. In addition, the rubber-reinforced, polystyrene resin material described in Patent documents 6-10 have problems such as deterioration of properties due to difficult control of particle diameter, presence of many fisheyes, and poor appearance of resin (color), ABS polymer has the same problems described above.

Namely, when molecular weight distribution of polybutadiene is wide, a reaction becomes unstable, graft tendency is lowered, uniformity of particle diameter of rubber in ABS polymer or HIPS polymer is disturbed, and average particle size increases. As a result, gross and graft tendency of the polymer deteriorate thereby to lower impact, resistance and tensile properties. In particular, since the ABS polymer employs acrylonitrile as a monomer, viscosity of the ABS polymer solution becomes higher than that of HIPS polymer solution. Further, the ABS polymer necessitates more rubber in resin than the HIPS polymer. Therefore, where the rubber having wide molecular weight distribution is used in the ABS polymer, it has a bad influence upon the ABS polymer than the HIPS polymer.

Furthermore, a solution obtained by resolving polybutadiene in monomer is filtered in order to remove insoluble matter. In this case, when the gel content of polybutadiene employed in the ABS polymer or HIPS polymer is high, a filter member is frequently clogged with the insoluble matter. The polystyrene film produced using a rubber having high gel content has a problem of fish-eye.

Furthermore, when the APHA color of each of the polybutadiene and the modified polybutadiene becomes large, there is a problem that the ABS polymer or HIPS polymer gets into yellowing.

It is an object of the present invention to provide a polybutadiene and a modified polybutadiene having a controlled microstructure, a narrow molecular weight distribution, minimal gel content and a low APHA color, a method for producing the both, and a rubber-reinforced styrene resin composition using the same.

Means for Solving the Object

In order to attain the object, the present inventors have studied and found that a polybutadiene and a modified polybutadiene having a controlled microstructure, a narrow molecular weight distribution, minimal gel content and a low APHA color, preparation methods for both, and a rubber-reinforced styrene resin composition using the same, are provided by terminating polymerization in a certain termination condition of polymerization.

Namely, the present invention relates to a polybutadiene characterized in that the ratio ($Tcp/ML_{1+4}$) of a 5% toluene solution viscosity (Tcp) measured at 25° C. and a Mooney viscosity ($ML_{1+4}$) at 100° C. is at 2.0 or higher, a molecular weight distribution (Mw/Mn) is 2.80 or less, a gel content is 0.06 wt % or less, and an APHA color is 20 or less.

Further, the present invention relates to a polybutadiene characterized in that (1) content of 1,2-structure in the polybutadiene is 4 to 30%, (2) content of cis-1,4-structure in the polybutadiene is 65 to 95%, (3) content of trans-1,4-structure in the polybutadiene is 5% or less, a molecular weight distribution (Mw/Mn) is 2.80 or less, a gel content is 0.06 wt % or less, and an APHA color is 20 or less.

Still further, the present invention relates to a method for producing a polybutadiene characterized by adding a polymerization inhibitor to a polybutadiene solution in a polymerization process in which a ratio ($Tcp/ML_{1+4}$) of a 5% toluene solution viscosity (Tcp) measured at 25° C. and a Mooney viscosity (ML1∝) at 100° C. is 2.0 or higher, thereby to stop a polymerization in a stirring state where polymerization inhibitor particles each having a particle size of 135 mm or less are dispersed in the polybutadiene solution.

Further, the present invention relates to a method for producing a polybutadiene characterized by adding a polymerization inhibitor to a polybutadiene solution in a polymerization process of the polybutadiene in which (1) content of 1,2-structure in the polybutadiene is 4 to 30%, (2) content of cis-1,4-structure in the polybutadiene is 65 to 95%, (3) content of trans-1,4-structure in the polybutadiene is at most 5%, thereby to terminate a polymerization in a stirring state where polymerization inhibitor particles each having a particle size of 135 mm or less are dispersed in the polybutadiene solution.

Still further, the present invention relates to a rubber-reinforced styrene resin composition comprising a styrene monomer, an unsaturated nitrile monomer, and a rubber-like polymer, characterized in that the rubber-like polymer is the polybutadiene described above.

Further, the present invention relates to a rubber-reinforced styrene resin composition comprising a styrene monomer, an unsaturated nitrile monomer, and a rubber-like polymer, characterized in that the rubber-like polymer includes the polybutadiene (a) described above, and a diene rubber (b) excluding the polybutadiene (a).

Still further, the present invention relates to a rubber-reinforced styrene resin composition comprising a styrene monomer and a rubber-like polymer, characterized in that the rubber-like polymer is the polybutadiene described above.

Further, the present invention relates to a rubber-reinforced styrene resin composition comprising a styrene monomer and a rubber-like polymer, characterized in that the rubber-like polymer includes the polybutadiene (a) described above, and a diene rubber (b) excluding the polybutadiene (a).

Still further, the present invention relates to a modified polybutadiene produced by modifying a raw polybutadiene having a ratio ($Tcp/ML_{1+4}$) of a 5% toluene solution viscosity (Tcp) measured at 25° C. and a Mooney viscosity (ML1+4 ) at 100° C., of 2.0 or higher, in the presence of a transition metal catalyst for modification, characterized in that a molecular weight distribution (Mw/Mn) is 2.80 or less, a gel content is 0.06 wt % or less, and an APHA color is 20 or less.

Further, the present invention relates to a modified polybutadiene produced by modifying a raw polybutadiene in which (1) content of 1,2-structure is 4 to 30%, (2) content of cis-1,4-structure is 65 to 95%, (3) content of trans-1,4-structure is 5% or less, in the presence of a transition metal catalyst for modification, characterized in that a molecular weight distribution (Mw/Mn) is 2.80 or less, a gel content is 0.06 wt % or less, and an APHA color is 20 or less.

Still further, the present invention relates to a method for producing a modified polybutadiene characterized by comprising adding a transition metal catalyst for modification to a raw polybutadiene in which a ratio ($Tcp/ML_{1+4}$) of a 5% toluene solution viscosity (Top) measured at 25° C. and a Moony viscosity ($ML_{1+4}$) at 100 ° C. is 2.0 or higher, thereby to modify it, and adding a polymerization inhibitor to a polybutadiene solution thereby to terminate a polymerization in a stirring state where polymerization inhibitor particles each having a particle size of 130 mm or less are dispersed in the polybutadiene solution.

Further, the present invention relates to a method for producing a modified polybutadiene characterized by comprising adding a transition metal catalyst for modification to a raw polybutadiene in which (1) content, of 1,2-structure is 4 to 30%, (2) content of cis-1,4-structure is 65 to 95%, (3) content of trans-1,4-structure is 5% or less, thereby to modify it, and adding a polymerization inhibitor to a polybutadiene solution thereby to terminate a polymerization in a stirring state where polymerization inhibitor particles each having a particle size of 130 iron, or less are dispersed in the polybutadiene solution.

Still further, the present invention relates to a rubber-reinforced styrene resin composition comprising a styrene monomer, an unsaturated nitrile monomer, and a rubber-like polymer, characterized in that the rubber-like polymer is the modified polybutadiene described above.

Further, the present invention relates to a rubber-reinforced styrene resin composition comprising a styrene monomer, an unsaturated nitrile monomer, and a rubber-like polymer, characterised in that the rubber-like polymer includes the modified polybutadiene (a) described above, and a diene rubber (b) excluding the polybutadiene (a).

Further, the present invention relates to a rubber-reinforced styrene resin composition comprising a styrene monomer and a rubber-like polymer, characterized in that the rubber-like polymer is the modified polybutadiene described above.

Further, the present invention relates to a rubber-reinforced styrene resin composition comprising a styrene monomer and a rubber-like polymer, characterized in that the rubber-like polymer includes the modified polybutadiene (a) described above, and a diene rubber (b) excluding the modified polybutadiene (a).

Advantage of the Invention

As described above, according to the present invention, there are provided a polybutadiene and a modified polybutadiene having a controlled microstructure, a narrow molecular weight distribution, minimal gel content, and a low APHA color, a method for producing the both, and a rubber-reinforced styrene resin composition using the same.

DESCRIPTION OF EMBODIMENTS ((a) Polybutadiene)

Figure 1:
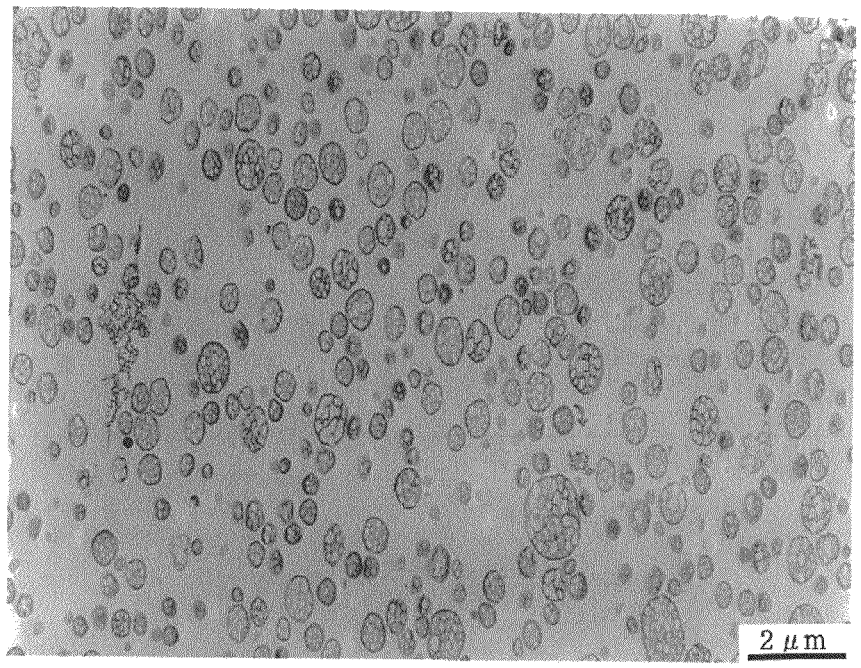
FIG. 1 is a TEM photograph showing the rubber-reinforced styrene resin composition of Example 32.

The polybutadiene of the present invention has a 5% toluene solution viscosity (Tcp) measured at 25° C. of preferably 25 to 300, particularly preferably 45 to 200. Further, the polybutadiene of the present invention has a Mooney viscosity ($ML_{1+4}$) at 100° C. of preferably 10 to 200, particularly preferably 25 to 100. Still further, in the polybutadiene of the present invention, a ratio ($Tcp/ML_{1+4}$) of a 5% toluene solution viscosity (Tcp) measured at 25° C. and a Mooney viscosity ($ML_{1+4}$) at 100° C. is 2.0 or higher, preferably 2.2 to 7.0.

Further, in the polybutadiene of the present invention, content of 1,2-structure is 4 to 30%, preferably 5 to 25%, more preferably 7 to 15%, content of cis-1,4-structure is 65 to 95%, preferably 70 to 95%, more preferably 70 to 92%, and content of trans-1,4-structure is 5% or less, preferably 4.5% or less, more preferably 0.5 to 4%. Since, when the contents of the microstructures are beyond the above range, reactivity of the polymer (graft reaction, cross-linking reaction, etc.) becomes insufficient, rubbery property as an additive deteriorates, and balance of physical properties and appearance of the polymer suffers bad influence, it is undesirable. It is important for the present invention that the polybutadiene having the microstructure specified above is used as a raw material. Where, such polybutadiene is used, effects on improvement of physical properties appear remarkably in comparison with the case where another diene rubber is used.

Furthermore, the polybutadiene of the present invention has a molecular weight reduced to polystyrene, preferably of the following range. The number-average molecular weight (Mn) of the polybutadiene is preferably $0.2 \times 10^5$ to $10 \times 10^5$, more preferably $0.5 \times 10^5$ to $5 \times 10^5$. The weight-average molecular weight (Mw) of the polybutadiene is preferably $0.5 \times 10^5$ to $20 \times 10^5$, more preferably $1 \times 10^5$ to $10 \times 10^5$. The polybutadiene of the present invention has a molecular weight distribution (Mw/Mn) is 2.80 or less, preferably 1.50 to 2.60, particularly preferably 1.80 to 2.40. By controlling the molecular weight distribution to such ranges, when the polybutadiene is used as a modifying agent for a styrene resin, it is possible to control easily the rubber particle diameter and to make the rubber particle size uniform. Further, by controlling the molecular weight distribution to such ranges, it is possible to improve a gloss, graft tendency, and also impact resistance.

Furthermore, in the present invention, a gel content of the polybutadiene is 0.060 wt % or less, preferably 0.020 wt. % or less, and more preferably 0.0001 to 0.010 wt %. By controlling the gel content of the polybutadiene to such low ranges, it is possible to prevent a filter for removing the unsolved gel in the polybutadiene solution from clogging as possible. Further, by suppressing the gel content of the polybutadiene, it is possible to prevent a problem of the fisheye caused when the polybutadiene is used for rubber.

An APHA color of the polybutadiene of the present invention is 20 or less, preferably 15 or less. Since, when the APHA color of the polybutadiene becomes larger than 20, the rubber-reinforced styrene resin composition obtained by using the polybutadiene gets into yellowing, which is undesirable.

Still further, in the polybutadiene of the present invention, yellow index (YI) is preferably 23 or less, more preferably −5 to 18, particularly preferably 0 to 8. By controlling YI to low ranges, it is possible to apply the polybutadiene to a use for a transparent resin or a white resin, and to easily color a resin an objective, color. Incidentally, since the yellow index of the polybutadiene increases with age, the yellow index in the present invention is a value measured in production.

A molecular weight of the polybutadiene of the present invention is preferably 0.1 to 10, particularly preferably 1 to 3, in terms of intrinsic viscosity (η) measured at 30 ° C. in toluene.

Still furthermore, the polybutadiene of the present invention has a cold flow speed (CF) of preferably 50 mg/min or less, more preferably 45 mg/min or less, particularly preferably 40 mg/min or less.

Further, the polybutadiene of the present, invention has a 5% styrene solution viscosity (St-cp) measured at 25° C. of preferably 20 to 400, particularly preferably 40 to 300. A ratio (St-cp/$ML_{1+4}$) of a 5% styrene solution viscosity (St-cp) to a Mooney viscosity ($ML_{1+4}$) at 100° C. is preferably 9 or less, more preferably 1.0 to 6.0, particularly preferably 2.0 to 5.0.

(Method for Producing Polybutadiene)

The polybutadiene of the present invention can be produced by polymerizing butadiene using a catalyst comprising (A) metallocene type complex of transition-metal compound, and (B) an ionic compound of non-coordinate anion and cation and/or alumoxanes, for example.

Alternatively, the polybutadiene of the present invention can be produced by polymerizing butadiene using a catalyst, comprising (A) metallocene type complex of transition metal compound, (B) an ionic compound of non-coordinate anion and cation, (C) an organometallic compound of group 1-3 element in the periodic table, and (D) water.

The metallocene type complex of transition metal compound of component (A) includes a metallocene type complex of transition metal of group 4-8 element in the periodic table.

The metallocene type complex of transition metal of group 4-8 element includes a metallocene type complex of transition metal of group 4 element such as titan and zirconium (e.g., $CpTiCl_3$ etc.), a metallocene type complex of transition metal of group 5 element such as vanadium, niobium, and tantalum, a metallocene type complex of transition metal of group 6 element such as chromium, and a metallocene type complex of transition metal of group 8 element such as cobalt and nickel.

Among them, a metallocene type complex of transition metal of group 5 is used preferably.

The metallocene type complex of transition metal of group 5 includes compounds represented by the general formulas of (1) RM.La, (2) $R_n$ $MX_{2-n}$.La, (3) $R_n MX_{3-n}$.La, (4) $RMX_3$.La, (5) $RM(O)X_2$.La, (6) $R_n MX_{3-n}$(NR'), in which n is 1 or 2, and a is 0, 1, or 2.

Among them, RM.La, $RMX_3$.La, $RM(O)X_2$.La, etc. is preferable.

M is a compound of a transition metal of group 5 in the periodic table, and is specifically vanadium (V), niobium (Nb) or tantalum (Ta). Preferable metal is vanadium.

R denotes cyclopentadienyl group, substituted cyclopentadienyl group, indenyl group, substituted indenyl group, fluorenyl group or substituted fluorenyl group.

The substituent in the substituted cyclopentadienyl group, the substituted indenyl group, or the substituted fluorenyl group, includes, for example, straight chain or branched chain aliphatic hydrocarbon groups such as methyl, ethyl, propyl, isopropyl, n-butyl, isobutyl, sec-butyl, tert-butyl, hexyl and the like; aromatic hydrocarbon groups such as phenyl, tolyl, naphthyl, benzyl and the like; and silicon atom-containing hydrocarbon groups such as trimethylsilyl and the like. Further, the substituent includes those groups in which cyclopentadienyl ring is bonded to part of X through a cross-linking group such as dimethylsilyl, dimethylmethylene, methylphenylmethylene, diphenylmethylene, ethylene, substituted ethylene or the like.

X denotes hydrogen, halogen, hydrocarbon group having 1 to 20 carbon atom/s, alkoxy group or amino group. All X's may be the same or different front each other.

Specific examples of the halogen include fluorine atom, chlorine atom, bromine atom, and iodine atom.

Specific examples of the hydrocarbon groups having 1 to 20 carbon atom/s include straight chain or branched chain aliphatic hydrocarbon groups such as methyl, ethyl, propyl and the like; aromatic hydrocarbon groups such as phenyl, tolyl, naphthyl, benzyl and the like. Further, the hydrocarbon group includes silicon atom-containing hydrocarbon groups such as trimethylsilyl and the like. Among them, methyl, benzyl, trimethylsilyl and the like are preferable.

Specific examples of the alkoxy group include methoxy, ethoxy, phenoxy, propoxy, butoxy and the like. Amyloxy, hexyloxy, octyloxy, 2-ethylhexyloxy, methylthio and the like can be also used.

Specific examples of the amino group include dimethylarsino, diethylamino, diisopropylamino, bistrimethylsilylamino and the like.

Among them, X is preferably hydrogen, fluorine atom, chlorine atom, bromine atom, methyl, ethyl, butyl, methoxy, ethoxy, dimethylamino, diethylamino, bistrimethylsilylamino and the like.

L denotes a Lewis base and is an ordinary inorganic or organic compound of Lewis base type, which can be coordinated to a metal. A compound having no active hydrogen is preferred particularly. Specific examples of L include ether, ester, ketone, amine, phosphine, silyloxy compound, olefin, diene, aromatic compound, alkyne and the like.

NR' denotes an imide group. R' denotes a hydrocarbon group having 1 to 25 carbon atom/s. Specific examples of R' include straight chain or branched chain aliphatic hydrocarbon groups such as methyl, ethyl, propyl, isopropyl, n-butyl, isobutyl, sec-butyl, tert-butyl, hexyl, octyl, neopentyl and the like; aromatic hydrocarbon groups such as phenyl, tolyl, naphthyl, benzyl, 1-phenylethyl, 2-phenyl-2-propyl, 2,6-dimethylphenyl, 3,4-dimethylphenyl and the like. Further, R' includes also silicon atom-containing hydrocarbon groups such as trimethylsilyl and the like.

Among these metallocene type complexes of a group 5-transition metal in the periodic table, a vanadium compound, in which M is vanadium, is preferred. Preferable vanadium compound is, for example, RV.La, RVX.La, $R_2V$.a, $RVX_2$.La, $R_2VX$.La, $RVX_3$.La, and $RV(O)X_2$.La. Particularly preferable vanadium compound is RV.La, $RVX_3$.La, and $RV(O)X_2$.La.

The specific compound represented by $RMX_3$.La described above includes the following items of (i) to (xvi).

(i) There can be mentioned cyclopentadienyl vanadium trichloride; mono-substituted cyclopentadienyl vanadium trichlorides, for example, methylcyclopentadienyl vanadium trichloride, ethylcyclopentadienyl vanadium trichloride, propylcyclopentadienyl vanadium trichloride, and isopropylcyclopentadienyl vanadium trichloride and the like.

(ii) There can be mentioned 1,2-di-substituted cyclopentadienyl vanadium trichlorides, for example, (1,2-dimethylcyclopentadienyl)vanadium trichloride and the like.

(iia) There can be mentioned 1,3-di-substituted cyclopentadienyl vanadium trichlorides, for example, (1,3-dimethylcyclopentadienyl)vanadium trichloride and the like.

(iii) There can be mentioned 1,2,3-tri-substituted cyclopentadienyl vanadium trichlorides, for example, (1,2,3-trimethylcyclopentadienyl)vanadium trichloride and the like.

(iv) There can be mentioned 1,2,4-tri-substituted cyclopentadienyl vanadium trichlorides, for example, (1,2,4-trimethylcyclopentadienyl)vanadium trichloride and the like.

(v) There can be mentioned tetra-substituted cyclopentadienyl vanadium trichlorides, for example, (1,2,3,4-tetramethylcyclopentadienyl)vanadium trichloride and the like.

(vi) There can be mentioned penta-substituted cyclopentadienyl vanadium trichlorides, for example, (pentamethylcyclopentadienyl)vanadium trichloride and the like.

(vii) There can be mentioned indenylvanadium trichloride.

(viii) There can be mentioned substituted indenylvanadium trichloride, for example, (2-methylindenyl)vanadium trichloride and the like.

(ix) There can be mentioned monoalkoxide, diaikoxide and trialkoxide in which alkoxy group is substituted for the chlorine atom of (i) to (viii) compound and the like. For example, there can be mentioned cyclopentadienylvanadium tritert-butoxide, cyclopentadienylvanadium tri-isopropoxide, cyclopentadienylvanadium dimethoxychloride and the like.

(x) There can be mentioned methyl-substituted compounds in which methyl group is substituted for the chlorine atom of (i) to (ix) compound.

(xi) There can be mentioned compound in which R and X are bonded through means of hydrocarbon group or silyl group. For example, (tert-butylamide)dimethyl($\eta^5$-cyclopentadienyl)silanevanadium dichloride and the like.

(xii) There can be mentioned methyl-substituted compounds in which methyl group is substituted for the chlorine atom of (xi) compound.

(xiii) There can be mentioned monoalkoxy-substituted or dialkoxy-substituted compounds in which alkoxy group is substituted for the chlorine atom of (xi) compound.

(xiv) There can be mentioned methyl-substituted compounds in which methyl group is substituted for the chlorine atom of (xiii) monochloride compound.

(xv) There can be mentioned amide-substituted compounds in which amide group is substituted for the chlorine atom of (i) to (viii) compound. For example, cyclopentadienyltris(diethylamide)vanadium, cyclopentadienyltris(isopropylamide)vanadium and the like.

(xvi) There can be mentioned methyl-substituted compounds in which methyl group is substituted for the chlorine atom of (xv) compound.

The specific compound represented by $RM(O)X_2$ described above includes following compounds (a) to (d).

(a) There can be mentioned cyclopentadienyl oxovanadium dichloride, methylcyclopentadienyl oxovanadium dichloride, benzylcyclopentadienyl oxovanadium dichloride, (1,3-dimethylcyclopentadienyl)oxovanadium dichloride, etc. There can also be mentioned methyl-substituted compounds in which methyl group is substituted for chlorine atom of compounds described above.

(b) There can be mentioned compound in which R and X are bonded through hydrocarbon group or silyl group, For example, there can be mentioned amidochloride such as (tert-butylamide)dimethyl ($\eta^5$-cyclopentadienyl) silane oxovanadium chloride and the like. There can also be mentioned methyl-substituted compounds in which methyl group is substituted for chlorine atom of these compounds.

(c) There can be mentioned cyclopentadienyl oxovanadium dimethoxide, cyclopentadienyl oxovanadium di-isopropoxide and the like. There can also be mentioned methyl-substituted compounds in which methyl group is substituted for chlorine atom of compounds described above.

(d) There can be mentioned (cyclopentadienyl)bis(diethylamide)oxovanadium and the like.

With regard to the ionic compound of non-coordinating anion and cation in the component (B), the non-coordinating anion includes, for example, tetra(phenyl)borate, tetra(fluorophenyl)borate, tetrakis(difluorophenyl)borate, tetrakis(trifluorophenyl)borate, tetrakis(tetrafluorophenyl)borate, tetrakis(pentafluorophenyl)borate, and the like.

Meanwhile, the cation includes carbonium cation, oxonium cation, ammonium cation, phosphonium cation, cycloheptyltrienyl cation, transition metal-containing ferrocenium cation and the like.

Specific examples of the carbonium cation include tri-substituted carbonium cations such as triphenyl carbonium cation, tris(substituted phenyl)carbonium cation and the like. Specific examples of the tris(substituted phenyl)carbonium cation includes tris(methylphenyl)carbonium cation, and tris (dimethylphenyl)carbonium cation.

Specific examples of the ammonium cation includes trialkyl ammonium cations such as trimethyl ammonium cation, triethyl ammonium cation, tripropyl ammonium cation, tributyl ammonium cation, tri(n-butyl)ammonium cation and the like; N,N-dialkyl anilinium cations such as N,N-dimethyl anilinium cation, N,N-diethyl anilinium cation and the like; and dialkyl ammonium cations such as di(i-propyl)alkyl ammonium cation and the like.

Specific examples of the phosphonium cation include triaryl phosphonium cations such as triphenyl phosphonium cation and the like.

As the ionic compound, there can be preferably used any combination of one of the above-described non-coordinating anions and one of the above-described cations.

Preferable ionic compounds are triphenyl carbonium tetrakis(pentafluorophenyl)borate, triphenyl carbonium tetrakis (fluorophenyl)borate, N,N-dimethyl anilinium tetrakis(pentafluorophenyl)borate, 1,1"-dimethyl ferrocenium tetrakis (pentafluorophenyl)borate and the like. The ionic compound may be used singly or in combination of two or more kinds.

An aluminoxane may be used as the component (B). The aluminoxane is obtained by contacting an organic aluminum compound with a condensation agent. The aluminoxane includes a chain aluminoxane and a cyclic aluminoxane, both represented by the general formula (—Al(R')O)n (wherein R' denotes a hydrocarbon group having 1 to 10 carbon atom/s and may be partly substituted with halogen atom and/or alkoxy group, n denotes a polymerization degree and is 5 or more, preferably 10 or more). R' is methyl group, ethyl group, propyl group or isobutyl group, the methyl group being preferred. The organic aluminum compound used as a raw material of the aluminoxane includes, for example, trialkyl aluminums such as trimethyl aluminum, triethyl aluminum, triisobutyl aluminum and the like; and mixtures thereof.

An aluminoxane obtained by using, as a raw material, a mixture of trimethyl aluminum and tributyl aluminum can be used preferably.

With respect to the condensation agent, water can be mentioned as a typical condensation agent. The other condensation agent includes any compound with which the trialkyl aluminum can give rise to a condensation reaction, for example, adsorbed water of an inorganic-compound and the like, and a diol.

Polymerization of conjugated diene may be carried out in combination of component (A), component (B), and component (C). As the component (C), an organic metal compound of group 1 to 3 element in the periodic table may be used. The addition of the component (C) increases polymerization activity. The organic metal compound of a group 1 to 3 element includes, for example, an organic aluminum compound, an organic lithium compound, an organic magnesium compound, an organic zinc compound, an organic boron compound ana the like.

Specific organic metal compound includes methyl lithium, butyl lithium, phenyl lithium, bistrimethylsilylmethyl lithium, dibutyl magnesium, dihexyl magnesium, diethyl zinc, trimethyl aluminum, triethyl aluminum, triisobutyl aluminum, boron trifluoride, triphenyl boron and the like.

Further, specific organic metal compound includes organic metal halide compounds such as ethyl magnesium chloride, dimethyl aluminum chloride, diethyl aluminum chloride, sesquiethyl aluminum chloride, ethyl aluminum dichloride and the like; and organic, metal, hydride compounds such as diethyl aluminum hydride, sesquiethyl aluminum hydride and the like. The organic metal compound may be used in combination of two or more kinds.

Preferable combination is the component (A) of $RMX_3$ such as cyclopentadienyl vanadium trichloride ($CpVCl_3$), or $RM(O)X_2$ such as cyclopentadienyl oxovanadium dichloride ($CpV(O)Cl_3$), the component (B) of triphenyl carbeniumtetrakis(pentafluorophenyl) borate, and the component (C) of trialkyl aluminum such as triethyl aluminum.

When the ionic compound is used as the component (B), the ionic compound can be combined with the above-described aluminoxane as the component (C).

The composition of the catalysts depends on various conditions and combination of the catalysts. The molar ratio (B)/(A) of the component (B), i.e. the aluminoxane to the component (A), i.e. the metallocene type complex is preferably 1 to 100000, more preferably 10 to 10000.

The molar ratio (B)/(A) of the component (B), i.e. the ionic compound to the component (A), i.e. the metallocene type complex is preferably 0.1 to 10, more preferably 0.5 to 5.

The molar ratio (C)/(A) of the component (C), i.e. the organic, metal compound to the component (A), i.e. the metallocene type complex is preferably 0.1 to 10000, more preferably 10 to 1000.

Preferably, water is added as a component (D) to the above-mentioned catalyst components. The molar ratio (C)/(D) of the component (C), i.e. the organic metal compound to the component (D), i.e. water is preferably 0.66 to 5, more preferably 0.7 to 3.0.

The addition order of the above catalyst components has no particular restriction. Hydrogen can be used in polymerization as well as the catalysts.

The amount of the hydrogen present is preferably 500 mmol or less, or 12 liters or less at 20° C., at 1 atm.; more preferably 50 mmol or less, or 1.2 liters or less at 20° C., at 1 atm., relative to 1 mol of the butadiene.

The compounds other than butadiene monomer include conjugated diene such as isoprene, 1,3-pentadiene, 2-ethyl-1,3-butadiene, 2,3-dimethylbutadiene, 2-methyl pentadiene, 4-methyl pentadiene, 2,4-hexadiene and the like, acyclic monoolefin such as ethylene, propylene, butene-1, butene-2, isobutene, pentene-1,4-methylpentene-1, hexene-1, octene-1 and the like, cyclic monoolefin such as cyclopentene, cyclohexene, norbornene and the like, and/or aromatic vinyl compound such as styrene, α-methylstyrene and the like, non-conjugated diolefin such as dicyclopentadiene, 5-ethylidene-2-norbornene, 1,5-hexadiene and the like.

The polymerization method is not limited, and there can be employed solution polymerization, bulk polymerization using 1,3-butadiene in itself, as a polymerization solvent, etc. The polymerization solvent includes aromatic hydrocarbons such as toluene, benzene, xylene and the like; aliphatic hydrocarbons such as n-hexane, butane, heptane, pentane and the like; alicyclic hydrocarbons such as cyclopentane, cyclohexane and the like; olefinic hydrocarbons such as 1-butene, 2-butene and the like; hydrocarbon solvents such as mineral spirit, solvent naphtha, kelosine and the like; and hydrocarbon halide solvents such as methylene chloride and the like.

In the present invention, it is preferred that prepolymerization is carried out using the above described catalyst at a prescribed temperature. The prepolymerization can be carried out by vapor phase process, solution process, slurry process, bulk process and the like. After the solid or liquid obtained by the prepolymerization is separated, the separated solid or liquid is subjected to main polymerization. Alternatively, the solid or liquid obtained by the prepolymerization can be subjected to main polymerization without being separated.

The polymerization temperature is preferably −100 to 200° C., particularly preferably −50 to 120° C. The polymerization time is preferably 2 minutes to 12 hours, particularly preferably 5 minutes to 6 hours.

After the polymerization has been conducted for a given length of time, a polymerization inhibitor is added to stop the polymerization. Thereafter, the inside pressure of the polymerization tank is released as necessary, and post-treatments such as washing, drying and the like are conducted.

In order to obtain the butadiene of the present invention, it is necessary to improve a dispersibility of the added polymerization inhibitor. By improving the dispersibility of a polymerization inhibitor, it is possible to react effectively the polymerization catalyst with the polymerization inhibitor and to deactivate the polymerization catalyst.

The polymerization inhibitor having an excellent dispersibility includes water, lower alcohols having 1 to 5 carbon atom/s and the like. In order to improve the dispersibility of the polymerization inhibitor, it is necessary to adjust the addition amount, thereof. For example, the content of the water is preferably $1.38 \times 10^{-8}$ to 13 vol %, more preferably $2.76 \times 10^{-8}$ to 10 vol %, still more preferably $4.14 \times 10^{-8}$ to 1 vol %, based on the volume of the total raw solution mixture. The total raw solution mixture means a mixture of the water and the raw materials which is to be charged into a reaction vessel and is a mixed solution of the raw material of butadiene, and solvents of cyclohexane and butene.

Further, in order to improve the dispersibility of the polymerization inhibitor, it is possible to adjust a viscosity of the polymerized solution, a rotating speed of a stirrer, a shape of an agitating blade, a shape of a polymerization vessel, a density of the polymerization inhibitor, a shape of an addition nozzle and the like. As seen from agitating Reynolds number $Re = d^2 \cdot n \cdot \rho / \mu$ in which d denotes representative diameter (m), n, rotating number (rps), $\rho$, density (kg/m$^3$), $\mu$, density (Pa·s), it is also possible to improve the dispersibility of the polymerization inhibitor by decreasing a viscosity of the solution or increasing a rotating number. For example, when the rotating number increases to 700 rpm from 500 rpm, the agitating Reynolds number increases 1.4 times. Even if any method is employed, it suffices that the polymerization inhibitor disperses in a particulate state without forming a continuous phase thereof in a rubber solution.

As an index showing a dispersibility of the polymerization inhibitor, there is a particle diameter of the polymerisation inhibitor in a dispersion state. It is important for the present invention that the polymerization inhibitor is added after polymerization, and dispersed in the rubber solution in a particulate state without forming a continuous phase. Particle diameter of the dispersed polymerization inhibitor is 135 mm or less, preferably 75 mm or less, more preferably 20 mm or less.

((a): Modified Polybutadiene)

In the modified polybutadiene of the present invention, the number-average molecular weight (Mn) thereof ranges preferably $0.2 \times 10^5$ to $10 \times 10^5$, more preferably $0.5 \times 10^5$ to $5 \times 10^5$. The weight-average molecular weight (Mw) thereof ranges preferably $0.5 \times 10^5$ to $20 \times 10^5$, more preferably $1 \times 10^5$ to $10 \times 10^5$. The modified polybutadiene of the present invention has a molecular weight distribution (Mw/Mn) of 2.80 or less, preferably 1.50 to 2.60, particularly preferably 1.80 to 2.40. By controlling the molecular weight distribution to such ranges, it is possible to control easily the particle diameter and to make the particle size uniform. Further, by controlling the molecular weight distribution to such ranges, it is possible to improve a gloss, graft tendency, and also impact resistance.

Furthermore, in the modified polybutadiene of the present invention, a gel content of the polybutadiene is 0.060 wt % or less, preferably 0.020 wt % or less, more preferably 0.0001 to 0.010 wt %. By controlling the gel content of the polybutadiene to such low ranges, it is possible to prevent a filter for removing the unsolved gel in the polybutadiene solution from clogging as possible. Further, by suppressing the gel content of the polybutadiene, it is possible to prevent a problem of the fisheye caused when the polybutadiene is used for rubber.

An APHA color of the modified polybutadiene of the present invention is 20 or less, preferably 15 or less. When the APHA color of the modified polybutadiene becomes larger than 20, the rubber-reinforced styrene resin composition obtained by using the modified polybutadiene gets into yellowing, which is undesirable.

Still further, in the modified polybutadiene of the present invention, yellow index (YI) is preferably 23 or less, more preferably −5 to 18, particularly preferably 0 to 8. By controlling YI to such low ranges, it is possible to employ the modified polybutadiene in a use for a transparent resin or a white resin, and to easily color a resin an objective color. Incidentally, since the yellow index of the modified polybutadiene increases with age, the yellow index in the present invention is a value measured when it is produced.

The modified polybutadiene obtained in the present, invention has a Mooney viscosity ($ML_{1+4}$) at 100° C. of preferably 10 to 200, more preferably 25 to 100, and a 5% toluene solution viscosity (Top) measured at 25° C. of preferably 25 to 300, more preferably 45 to 200. A ratio ($Tcp/ML_{1+4}$) of a 5% toluene solution viscosity (Tcp) measured at 25° C. and a Mooney viscosity ($ML_{1+4}$) at 100° C. is preferably 5 or less, more preferably 1.0 to 4.5, particularly preferably 2.0 to 4.0.

Further, the modified polybutadiene obtained in the present invention has a 5% styrene solution viscosity (St-cp) measured, at 25° C. of preferably 20 to 400, more preferably 40 to 300. A ratio ($St-cp/ML_{1+4}$) of a 5% styrene solution viscosity (St-cp) to a Mooney viscosity ($ML_{1+4}$) at 100° C. is preferably at most 9, more preferably 1.0 to 6.0, particularly preferably 2.0 to 5.0.

Still furthermore, the modified polybutadiene obtained in the present invention has a cold flow speed (CF) of preferably 35 mg/min or less, more preferably 32 mg/min or less, particularly preferably 30 mg/min or less.

(Raw Polybutadiene of the Modified Polybutadiene)

In the raw polybutadiene used in the modified polybutadiene of the present invention, content of 1,2-structure is 4 to 30%, preferably 5 to 25%, more preferably 7 to 15%, content of cis-1,4-structure is 65 to 95%, preferably 70 to 95%, more preferably 70 to 92%, and content of trans-1,4-structure is 5% or less, preferably 4.5% or less, more preferably 0.5 to 4%.

Since, when the contents of the microstructures are beyond the above range, reactivity of the polymer (graft reaction, cross-linking reaction, etc.) becomes insufficient, undesirably, rubbery property as an additive deteriorates, and balance of physical properties and appearance of the polymer suffers bad influence.

It is important for the present invention that the polybutadiene having the microstructure specified above is used as a raw material. Where such polybutadiene is used, effects on improvement of physical properties appear remarkably in comparison with the case where another diene rubber is used.

The raw polybutadiene used in the modified polybutadiene of the present invention has a Mooney viscosity ($ML_{1+4}$) at 100° C. of preferably 10 to 200, more preferably 25 to 100, a 5% toluene solution viscosity (Tcp) measured of preferably 25 to 300, more preferably 45 to 200, and a ratio ($Tcp/ML_{1+4}$) of a 5% toluene solution viscosity (Tcp) measured and a Mooney viscosity ($ML_{1+4}$) at 100° C. is at most 2.0, more preferably 2.2 to 7.0.

Further, the raw polybutadiene used in the modified polybutadiene of the present invention has a 5% styrene solution viscosity (St-cp) measured of preferably 20 to 300, more preferably 25 to 250. A ratio ($St-cp/ML_{1+4}$) of a 5% styrene solution viscosity (St-cp) to a Mooney viscosity ($ML_{1+4}$) at 100° C. is preferably 9 or less, more preferably 1.0 to 6.0, particularly preferably 2.0 to 5.0.

The raw polybutadiene used in the modified polybutadiene of the present invention has a molecular weight of preferably 0.1 to 10, particularly preferably 1 to 3 as an intrinsic viscosity [η] measured at 30° C. in toluene.

Further, the raw polybutadiene used in the modified polybutadiene of the present invention has a molecular weight reduced to polystyrene, preferably of the following range. The number-average molecular weight (Mn) of the polybutadiene is preferably $0.2 \times 10^5$ to $10 \times 10^5$, more preferably $0.5 \times 10^5$ to $5 \times 10^5$. The weight-average molecular weight (Mw) of the polybutadiene is preferably $0.5 \times 10^5$ to $20 \times 10^5$, more preferably $1 \times 10^5$ to $10 \times 10^5$. The raw polybutadiene of the present invention has a molecular weight distribution (Mw/Mn) is 2.80 or less, preferably 1.50 to 2.60, particularly preferably 1.80 to 2.40.

The raw polybutadiene used in the present invention can be produced by the same method as that employed in producing the polybutadiene of the present invention described above. It is unnecessary to improve the dispersibility of the polymerization inhibitor unlike above-described case.

(Modifying Method of the Raw Polybutadiene)

After the polymerization reaction attained a prescribed polymerization rate, a transition metal catalyst for modification is added to cause reaction, whereby the polymer chain is modified.

The transition metal catalyst for modification used in the present invention is preferably a system containing a transition metal compound, organic aluminum, and water.

The transition metal compound in the transition metal catalyst for modification includes titanium compound, zirconium compound, vanadium compound, chromium compound, manganese compound, iron compound, ruthenium compound, cobalt compound, nickel compound, palladium compound, copper compound, silver compound, zinc compound and the like. Among them, the cobalt compound is preferred.

As the cobalt compound, a salt or complex of cobalt is preferably used. Particularly preferable cobalt compound includes a cobalt salt such as cobalt chloride, cobalt bromide, cobalt nitrate, cobalt octylate, cobalt naphthenate, cobalt, versatate, cobalt acetate, cobalt malonate and the like; bisacetyl acetonate or trisacetyl acetonate of cobalt; cobalt ethyl ester of acetoacetate; a organic base complex of cobalt halide such as triarylphosphine complex of cobalt halide, trialkylphosphine complex of cobalt halide, pyridine complex of cobalt halide, picoline complex of cobalt, halide; and ethyl alcohol complex of cobalt halide.

Among them, cobalt octylate, cobalt naphthenate, cobalt versatate, and bisacetyl acetonate or trisacetyl acetonate of cobalt are preferred.

The organic aluminum compound in the transition metal catalyst includes trialkyl aluminum such as trimethyl aluminum, triethyl aluminum, triisobutyl aluminum, trihexyl aluminum, trioctyl aluminum, tridecyl aluminum and the like; dialkyl aluminum halide such as dimethyl aluminum chloride, dimethyl aluminum bromide, diethyl aluminum chloride, diethyl aluminum bromide, diethyl aluminum iodide, dibutyl aluminum chloride, dibutyl aluminum bromide, dibutyl aluminum iodide and the like; alkylaluminum sesqui halide such as methylaluminum sesqui chloride, methylaluminum sesqui bromide, ethylaluminum sesqui chloride, ethylsesquialminum bromide and the like; monoalkylaluminum halide such as methylaluminum dichloride, methylaluminum dibromide, ethylaluminum dichloride, ethylaluminum dibromide, butylaluminum dichloride, butylaluminum dibromide and the like. The organic aluminum compound may be used singly or in combination of two or more kinds. Among them, diethyl aluminum chloride can be preferably used.

In the transition metal catalyst, of the present invention, though any amount of the cobalt compound can be used depending on a desired degree of branching, the amount of the transition metal compound is preferably $1\times10^{-7}$ to $1\times10^{-3}$ mol, particularly preferably $5\times10^{-7}$ to $1\times10^{-4}$ mol based on 1 mol of butadiene existing at the time of a modification reaction.

Though any amount of the organic aluminum compound can be used depending on a desired degree of branching, the amount of the organic aluminum compound is preferably $1\times10^{-5}$ to $5\times10^{-2}$ mol, particularly preferably $5\times10^{-5}$ to $1\times10^{-2}$ mol based on 1 mol of butadiene existing at the time of a modification reaction.

Though any amount of water can be used depending on a desired degree of branching, the amount of the water is preferably 1.5 mol or less, particularly preferably 1 mol or less based on 1 mol of the organic aluminum compound.

After polymerization is conducted for a certain time, a polymerization inhibitor is added to stop the polymerization. Thereafter, the inside pressure of the polymerization tank is released as necessary, and post-treatments such as washing, drying and the like are conducted.

In order to obtain the modified butadiene of the present invention, it is necessary to improve a dispersibility of the polymerization inhibitor. By improving the dispersibility of a polymerization inhibitor, it is possible to effectively react the transition metal catalyst for modification with the polymerization inhibitor and to deactivate the transition metal catalyst.

The polymerization inhibitor having an excellent dispersibility includes water, lower alcohols having 1 to 5 carbon atom/s and the like. In order to improve the dispersibility of the polymerization inhibitor, it is necessary to adjust the addition amount thereof. For example, the content of the water ranges preferably between $1.38\times10^{-8}$ to 9.9 vol %, more preferably between 2.7 $6\times10^{-8}$ to 5 vol %, still more preferably between $4.14\times10^{-8}$ to 3 vol %, based on the volume of the total raw solution mixture. The total raw solution mixture means a mixture including a mixed solution of a raw material to be charged into a reaction vessel, and solvents, and the raw materials which is to be charged into a reaction vessel before modification. The raw material includes butadiene, and the solvents include cyclohexane and butene. Incidentally, it is unnecessary to add the raw materials before modification.

Further, in order to improve the dispersibility of the polymerization inhibitor, it is possible to adjust a viscosity of the polymerized solution, a rotating speed of a stirrer, a shape of an agitating blade, a shape of a polymerization vessel, an addition amount of the polymerization inhibitor, a shape of an addition nozzle and the like. As seen from agitating Reynolds number $Re=d^2*n*\rho/\mu$ in which d denotes representative diameter (m), n, rotating number (rps), $\rho$, density (kg/m$^3$), $\mu$, density (Pa·s), it is also possible to improve the dispersibility of the polymerization inhibitor by decreasing a viscosity of the solution or increasing a rotating number. For example, when the rotating number increases to 700 rpm from 500 rpm, the agitating Reynolds number increases 1.4 times. Even if any method is employed, it suffices that the polymerization inhibitor disperses in a particulate state without forming a continuous phase thereof in a rubber solution.

As an index showing a dispersibility of the polymerization inhibitor, there is a particle diameter of the polymerization inhibitor in a dispersion state. It is important for the present, invention that the polymerization inhibitor is added after modification reaction, and dispersed in the rubber solution in a particulate state without forming a continuous phase. Particle diameter of the dispersed polymerization inhibitor is 130 mm or less, preferably 75 mm or less, more preferably 20 mm or less.

(ABS Polymer and a Method of Producing the Same)

A rubber-reinforced styrene resin composition (abbreviated to ABS polymer, hereinafter) comprising a styrene monomer, an unsaturated nitrile monomer, and rubber-like polymer can be produced by graft polymerization of the above-described components according to conventional procedure. In the ABS polymer of the present invention, the rubber-like polymer has four aspects of (1) polybutadiene of the present invention, (2) the polybutadiene (a) of the present invention and a diene rubber (b) excluding the polybutadiene (a), (3) modified polybutadiene of the present invention, and (4) the modified polybutadiene (a) of the present, invention and a diene rubber (b) excluding the modified polybutadiene (a).

The above-described polymers can be employed as the polybutadiene (a) and the modified polybutadiene (a) used for the rubber-like polymer. In this case, in order to improve an environmental stress-cracking resistance (ESCR), a Mooney viscosity ($ML_{1+4}$) at 100° C. of the polybutadiene (a) ranges preferably between 20 to 60, more preferably between 23 to 57, particularly preferably between 25 to 55, and a Mooney viscosity ($ML_{1+4}$) at 100° C. of the modified, polybutadiene (a) ranges preferably between 10 to 60, preferably between 13 to 57, particularly preferably between 15 to 55.

In the ABS polymer, when the Mooney viscosity of the polybutadiene is less than 20, or the Mooney viscosity of the raw polybutadiene of the modified polybutadiene is less than 10, a molecular weight of the polybutadiene becomes too small, and therefore tensile elongation retention after application of cyclopentane, which is an index of the environmental stress-cracking resistance (ESCR), is lowered. Further, baling is difficult due to cold flow problem. On the other hand, the Mooney viscosity becomes larger than 60, a control of the rubber particle diameter becomes difficult, and lowering of impact resistance becomes large as well as lowering of the tensile elongation retention after application of cyclopentane, which is an index of the environmental stress-cracking resistance.

The restriction of the Mooney viscosity ($ML_{1+4}$) at 100° C. of the raw polybutadiene is important for improvement in the environmental stress-cracking resistance (ESCR). When the Mooney viscosity is not within the determined range, it is not possible to obtain the desired environmental stress-cracking resistance (ESCR) together with retaining good impact resistance.

In order to improve the environmental stress-cracking resistance (ESCR), the styrene solution viscosity (St-cp) of the raw polybutadienes of the polybutadiene (a) and the modified polybutadiene (a) ranges preferably between 20 to 300, particularly preferably between 25 to 250. Further, in this case, (St-cp/$ML_{1+4}$) of the raw polybutadienes of the polybutadiene (a) and the modified polybutadiene (a) ranges preferably between 2.0 or more, particularly preferably between 2.5 to 9.0.

Furthermore, in order to improve the environmental stress-cracking resistance (ESCR), the graft rate of the polystyrene of the polybutadiene (a) and the modified polybutadiene (a) to the rubber range preferably between 50 to 200, particularly preferably between 80 to 180. Though the impact resistance generally tends to be improved as the graft rate elevates, when the Mooney viscosity ($ML_{1+4}$) at 100° C. becomes too high, the impact resistance tends to be lowered. Accordingly, it is important that both are set in a proper range.

Further, the diene rubber (b) to be used in the rubber-like polymer includes butadiene rubber, styrene-butadiene rubber, polyisoprene, chloroprene rubber, nitrile-butadiene rubber and the like. The butadiene rubber and styrene-butadiene rubber are preferred from the viewpoint of producing synergistic effect of these rubbers and the polybutadiene or modified polybutadiene (a).

As a butadiene rubber, the commercial butadiene rubber can be used. Since the microstructure is not restricted, a high-cis-polybutadiene having a cis-content of 90% or more, low-cis-polybutadiene having a cis-content of 50% or less and the like can be employed.

As a styrene-butadiene rubber, a solution-polymerized styrene-butadiene rubber having a styrene content of 50% or less and the like can be used.

A weight ratio of the polybutadiene or modified polybutadiene (a) to the diene rubber (b) excluding the polybutadiene (a) ranges preferably between 90/10 to 10/90, particularly preferably between 80/20 to 20/80. When the weight ratio is smaller than 10/90, tensile properties are undesirably lowered. On the other hand, when the weight ratio is larger than 90/10, ESCR is undesirably lowered.

The polybutadiene or modified polybutadiene (a) and the diene rubber (b) excluding the polybutadiene (a) can be blended by the conventional method such as dissolving in the styrene monomer.

100 weight parts of the ABS polymer composition of the present invention contains 0.5 to 25 weight parts, preferably 1 to 20 weight parts of the rubber-like polymer described above. When the content of the rubber-like polymer is smaller than the range, the advantage of the present invention cannot be obtained. Though the impact, resistance of the resin is improved according to increase of the rubber-like polymer content, when the content of the rubber-like polymer is larger than the range, control of the rubber particle diameter becomes difficult due to high viscosity of the styrene solution, the advantage of the present invention cannot be obtained, and the industrial utility of the resin are lost. Incidentally, when the composition is diluted with solvent, it is not applicable.

As an index showing yellowish of the ABS polymer of the present invention, there is yellow index (YI) of the ABS polymer, whereby the appearance (hue) of the ABS polymer is judged. It is necessary that the YI is 15 or less. YI of 16 or more has a bad influence on the appearance of the ABS polymer and is not preferable. Therefore, the smaller the APHA color of the polybutadiene, the more favorable for the appearance (hue) of the ABS polymer.

Though the method of producing the ABS polymer of the present invention is not limited, a bulk polymerization method is preferable, and in particular, a continuous bulk polymerization method is more preferable. For example, this method includes adding the rubber-like polymer to the mixed liquid of the styrene monomer and the acrylonitrile monomer, agitating the mixed liquid to dissolve the rubber-like polymer in the mixed liquid thoroughly at an adjusted temperature of 20 to 70° C., continuously supplying the solution to one-stage or two-stage reactor provided with a mixer to conduct, a polymerization, and separating a solid component and a volatile component such as an unreacted monomer and solvent in the final stage of the polymerization, thus obtaining the polymer.

In such a method, a rubber composition containing a solution formed by dissolving the polybutadiene or modified polybutadiene and the other diene rubber in the monomer-containing solution is introduced into a first-stage polymerization reactor, and a monomer, polymerization initiator and a chain transfer agent are introduced into the reactor in any stage.

As the method of producing the ABS polymer of the present invention, a method in which the styrene monomer is polymerized in the presence of the above-described modified polybutadiene, is employed. A bulk polymerization method and bulk emulsion polymerization method are economically advantageous methods. The styrene monomer includes a monomer known for producing the rubber-reinforced polystyrene resin composition or mixture of at least two kinds of the monomer, which is, for example, an alkyl-substituted styrene such as styrene, α-methylstyrene, p-methylstyrene and the like, and a halogen-substituted styrene such as chlorostyrene and the like. Among them, styrene is preferred.

When producing the ABS polymer, if necessary, ethylene-propylene rubber, ethylene-vinylacetate rubber, acrylic rubber or the like may be used together with the above-described rubber-like polymer. Further, the resins produced by these methods may be mixed. Furthermore, a rubber-reinforced styrene resin, which does not contain the ABS polymer produced by these methods, may be mixed. In one specific example of the bulk polymerization method, a modified polybutadiene (1 to 25 weight %) is dissolved in a styrene monomer (99 to 75 weight %), if necessary, with addition of a solvent, a molecular weight controlling agent, a polymerization initiator and the like, to form rubber particles containing the modified polybutadiene dispersed therein, and to continue polymerization to 10 to 40% conversion degree of styrene monomer. The rubber forms a continuous phase until the rubber particles are formed. Further, the polymerization continues through phase conversion (granulation step), in which dispersion phase of rubber particles is formed, to attain 50 to 99% conversion degree, thus forming the ABS polymer.

The rubber-like polymer is present in the ABS polymer produced in the present invention as dispersed particles (rubber particles). The ABS polymer is formed of the rubber-like polymer as particles dispersed in the resin, and the rubber-reinforced styrene resin which is graft-bonded with the rubber-like polymer. The rubber-like polymer having particle diameter of 0.3 to 10 μm, preferably 0.5 to 8.0 μm can be produced. In order to improve the environmental stress-cracking resistance (ESCR), the rubber-like polymer having particle diameter of 0.1 to 2.0 μm, preferably 0.3 to 1.8 μm can be produced.

In the present invention, the graft rate of rubber particles in the ABS polymer ranges between 50 to 300%, preferably between 80 to 250%. In order to improve the environmental stress-cracking resistance (ESCR), the graft rate of rubber particles in the ABS polymer ranges between 50 to 200%, preferably between 80 to 180%. When the graft rate of rubber particles in the ABS polymer is outside the range, properties of the ABS polymer, in particular an impact resistance and gross deteriorate are undesirable.

In the present invention, the production process may be also a batch process or a continuous process, and is not limited.

The present invention relates to a rubber-enforced styrene-acrylonitrile copolymer produced by dissolving the rubber-like polymer in the mixed solution of the styrene monomer, the unsaturated nitrile monomer, and if necessary another monomer copolymerizable with these monomers, thoroughly, and polymerizing the solution containing the monomers and the rubber-like polymer solution as a raw material. The mixed solution of a rubber composition comprising the monomers, the modified polybutadiene, and the other diene rubber may contain a solvent such as benzene, toluene, xylene, ethylbenzene, acetone, isopropylbenzene, methylethylketone, methylene chloride and the like. The polymerization method includes bulk polymerization method or bulk-emulsion two-stage polymerization method which comprises subjecting the solution obtained by dissolving the rubber-like polymer in the mixture of styrene monomer, unsaturated nitrile monomer and another monomer copolymerizable with these monomers to polymerization. Particularly, the polymerization is conducted by the bulk polymerization method.

The copolymer obtained by the above-described polymerization has a higher impact resistance than that of the copolymer obtained by merely blending, due to the graft effect on the rubber. In the present invention, the rubber-like polymer is graft-reacted with the styrene monomer and unsaturated nitrile monomer, and granulated and dispersed in the resin. A polymerization initiator may be preferably used in a thermal polymerization or reaction. For example, the polymerization initiator usable in the polymerization includes benzoyl peroxide, lauroyl peroxide, t-butyl peroxy pivalate, t-butyl peroxy benzoate, t-butyl peroxy isobutylate, t-butyl peroxy octoate, cumyl peroxy octoate, 1,1-bis(t-butylperoxy)-3,3,5-trimethyl siloxane, 2,2-bis(t-butylperoxy)octane, n-butyl-4,4-bis(t-butylperoxy)valerate, 2,2-bis(t-butylperoxy)butane, t-butylperoxy maleate, t-butylperoxy isopropylcarbonate, dicumyl peroxide, t-butyl hydroperoxide, cumene hydroperoxide and the like. These compounds may be used singly or in combination of two or more kinds. When, for example, an organic peroxide is used as the polymerization initiator, the amount of the polymerization initiator ranges between 0.0005 to 0.05 weight parts based on the 100 weight parts of the solution obtained by dissolving the organic peroxide in the polybutadiene or modified polybutadiene. When the amount of the polymerization initiator is less than 0.0005 weight parts, large rubber particles having a diameter of 10 μm or more is formed, the surface condition of the molded article deteriorates, and the mechanical strength is lowered, which are undesirable. When the amount of the polymerization initiator is more than 0.05 weight parts, the polymerization speed and graft rate to the rubber become out of balance, the surface condition of the molded article deteriorates, and the mechanical strength may be lowered, which are undesirable.

In the present invention, a chain transfer agent can be used in order to adjust the molecular weight of the styrene copolymer. It is possible to use α-methyl styrene dimer, t-dodecyl mercaptan, n-dodecyl mercaptan, n-octyl mercaptan and the like.

A reaction vessel used in the polymerization step is not limited. For example, a complete mixing type reaction vessel, a tube type reaction vessel, a tower type reaction vessel and the like are used. A sort and number of the reaction vessel are not limited.

The production process may be a batch process or a continuous process, and is not limited.

In the present invention, a raw solution containing mainly the above-described styrene monomer and polybutadiene or modified polybutadiene is subjected to polymerization in a complete mixing type reaction vessel. The complete mixing type reaction vessel may be any vessel in which the raw solution is kept in a uniform mixing state. A preferable vessel is one provided with an agitating blade such as a helical ribbon, double helical ribbon, anchor and the like. The agitating blade of a helical ribbon type is preferably provided with a draft tube in order to promote the circulation between upper and lower portions in the reaction vessel.

The styrene monomer used in the present invention includes styrene; a side-chain alkyl-substituted styrene such as α-methyl styrene and α-ethyl styrene; a nucleus alkyl-substituted styrene such as monochlorostyrene, dichlorostyrene, vinyl toluene, vinyl xylene, o-t-butylstyrene, p-t-butylstyrene and p-methylstyrene; a styrene halide such as tribromostyrene, tetrabromostyrene and the like; p-hydroxystyrene; o-methoxystyrene; vinylhaphthalene; and the like. Styrene and α-methyl styrene are particularly preferred. One or more kinds of these styrene monomers can be used.

The unsaturated nitrile monomer includes acrylonitrile, methacrylonitrile, fumaronitrile, maleonitrile, α-chloroacrylonitrile and the like. Particularly, acrylonitrile is preferred. One or more kinds of these monomers can be used.

One or more sorts of a methacrylate monomer such as methylmethacrylate and the like, an acrylate monomer such as methylacrylate and the like, a maleimide monomer such as maleimide, N-phenylmaleimide and the like may be substituted for parts of the styrene monomer and unsaturated nitrile monomer, which are constituting components of the copolymer used in the present invention, in the proportion of 30 weight % or less based on the total weights of the styrene monomer and unsaturated nitrile monomer. In order to improve heat resistance of the polymer, it is preferred to substitute maleimide monomer in the proportion of 1 to 30 weight %, more preferably 5 to 17 weight %.

The weight, ratio of copolymer of styrene monomer and unsaturated nitrile monomer, which constitute a continuous phase of the ABS polymer of the present invention, ranges preferably between 95/5 to 55/45, more preferably between 85/15 to 65/35.

The copolymer of styrene monomer and unsaturated nitrile monomer, which constitute a continuous phase of the ABS polymer of the present invention, has a weight-average molecular weight of preferably 50,000 or more, particularly preferably 100,000 to 400,000.

If necessary, the ABS polymer of the present invention may contain an anti-oxidizing agent such as a hindered phenol anti-oxidizing agent; phosphorus anti-oxidizing agent, sulfur anti-oxidizing agent and the like; a fluidity modifier such as a mineral oil and the like; a mold release agent such as stearic acid, zinc, stearate, organopolysiloxane and the like, which may be added to the raw solution, on the way to polymerization, or at the time of termination of polymerization.

The ABS polymer of the present invention can be blended with a resin such as polyvinyl chloride, polyolefin, styrene-acrylonitrile resin, polycarbonate, polybutylene terephthalate, polyethylene terephthalate, nylon 6, nylon 66, nylon 12, polyphenylene oxide, polyphenylene sulfide and the like to be subjected to molding.

Further, it is possible to add a fiber-reinforcing agent such as a glass fiber, an inorganic filler, a coloring agent, and a pigment to the ABS polymer according to the objects. It is possible to make the ABS polymer incombustible by adding an ordinary flame retarder of halogenated organic compound such as tetrabromobisphenol A, decabromobiphenyl ether, brominated polycarbonate and the like, together with antimony oxide to the ABS polymer. The rubber-modified styrene-acrylonitrile copolymer of the present invention can be molded by an ordinary molding method such as an injection molding and an extrusion molding to produce a molded product having a stiffness and impact resistance, which are balanced.

If necessary, the known additives can be added to the ABS polymer of the present invention during production or after production of the ABS polymer. The known additives include an anti-oxidation agent, a stabilizing agent such as an UV absorbing agent and the like; a mold release agent, a lubricant, a coloring agent, various fillers, various plasticizer, higher aliphatic acid, an organic polysiloxane, a silicone oil, a flame retarder, an antistatic agent, a blowing agent and the like. The ABS polymer of the present invention can be applied to known various molded articles and is suitable for injection molding employed in electric and industrial fields since it is excellent in flame retardancy, impact resistance, and tensile strength.

The ABS polymer can be applied to various uses for housing of domestic and industrial appliance for a television, an air conditioner, a refrigerator, a facsimile, telephone and the like; and for a film and sheet used as a wrapping material, food container and the like. Further, the high cis-high vinyl polybutadiene can be applied to a tire use for an automobile, and a non-tire use for a golf ball, a shoe sole and the like.

(HIPS Polymer and Method of Producing the Same)

In a rubber-reinforced styrene resin composition (abbreviated to HIPS polymer, hereinafter) comprising a styrene monomer and a rubber-like polymer, the rubber-like polymer has four aspects of (1) polybutadiene of the present invention, (2) the polybutadiene (a) of the present invention and a diene rubber (b) excluding the polybutadiene (a), (3) modified polybutadiene of the present invention, and (4) the modified polybutadiene (a) of the present invention and a diene rubber (b) excluding the modified polybutadiene (a).

The above-described polymers can be employed as the polybutadiene (a) and the modified polybutadiene (a) used as the rubber-like polymer. However, in order to improve an environmental stress-cracking resistance (ESCR), Mooney viscosities ($ML_{1+4}$) at 100° C. of the raw polybutadienes of the polybutadiene (a) and the modified polybutadiene (a) range preferably between 20 to 70, particularly between 30 to 60.

In the HIPS polymer, when the Mooney viscosities of the raw polybutadienes of the polybutadiene (a) and the modified polybutadiene (a) are less than 20, a molecular weight of the polybutadiene becomes too small, and therefore tensile elongation retention after application of cyclopentane, which is an index of the environmental stress-cracking resistance (ESCR), is lowered. Further, baling is difficult due to cold flow problem. On the other hand, the Mooney viscosity becomes larger than 70, a control of the rubber particle diameter becomes difficult, and lowering of impact resistance becomes large as well as lowering of the tensile elongation retention after application of cyclopentane, which is an index of the environmental stress-cracking resistance.

The restriction of the Mooney viscosity at 100° C. of the raw polybutadiene used in the present invention is important for improvement in the environmental stress-cracking resistance (ESCR). When the Mooney viscosity is not within the determined range, it is not possible to obtain the desired environmental stress-cracking resistance (ESCR) together with retaining good impact resistance.

In order to improve the environmental stress-cracking resistance (ESCR), the styrene solution viscosities (St-cp) of the raw polybutadienes of the polybutadiene (a) and the modified polybutadiene (a) range preferably between 20-400, particularly preferably between 40 to 300. Further, in this case, ((St-cp)/$ML_{1+4}$) of the raw polybutadienes of the polybutadiene (a) and the modified polybutadiene (a) range preferably between 2.0 or more, particularly preferably between 2.5 to 9.0.

Furthermore, in order to improve the environmental stress-cracking resistance (ESCR), the graft rate of the polystyrene of the polybutadiene (a) and the modified polybutadiene (a) to the rubber range preferably between 100 to 350, particularly preferably between 150 to 300. Though the impact resistance is generally increased as the graft rate elevates, when the Mooney viscosity at 100° C. becomes too high, the impact resistance tends to lower. Accordingly, it is important that, both the properties are set in a proper range.

Further, the rubber used in the ABS polymer can be used as the diene rubber (b).

100 weight parts of the HIPS polymer composition of the present, invention contains 0.5 to 25 weight parts, preferably 1 to 20 weight parts of the rubber-like polymer described above. When the content of the rubber-like polymer is smaller than the range, the advantage of the present invention cannot be obtained. Though the impact resistance of the resin is improved according to increase, of the rubber-like polymer content, when the content of the rubber-like polymer is larger than the range, control of the rubber particle diameter becomes difficult due to high viscosity of the styrene solution, the advantage of the present invention cannot be obtained, and the industrial utility of the resin are lost. Incidentally, when the composition is diluted with solvent, it is not applicable.

As an index showing yellowish of the HIPS polymer of the present invention, there is yellow index (YI) of the HIPS polymer, whereby the appearance (hue) of the HIPS polymer is judged. It is necessary that the YI is 5 or less. YI of 6 or more has a bad influence on the appearance of the HIPS polymer and is not preferable. Therefore, the smaller the HIPS polymer of the polybutadiene, the more favorable for the appearance (hue) of the HIPS polymer.

A method of polymerizing a styrene monomer in the presence of the above-described rubber-like polymer is employed as the method of producing the HIPS polymer of the present invention. A bulk polymerization method and bulk emulsion polymerization method are advantageous methods. The styrene monomer includes a monomer known for producing the HIPS polymer or mixture of at least two kinds of the monomer, which is, for example, styrene, an alkyl-substituted styrene such as α-methylstyrene, p-methylstyrene and the like, and a halogen-substituted styrene such as chlorostyrene and the like. Among them, styrene is preferred.

If necessary, when producing the HIPS polymer, styrene-butadiene copolymer, ethylene-propylene, ethylene-vinylacetate, acrylic acid rubber or the like may be used together with the above-described rubber-like polymer. Further, the resins produced by these methods may be mixed. Furthermore, a polystyrene resin, which does not contain the HIPS polymer produced by these methods, may be mixed with the HIPS polymer. In one specific example of the bulk polymerization method, a rubber composition (1 to 25 weight %) containing polybutadiene or modified polybutadiene and the other diene rubber are dissolved in a styrene monomer (99 to 75 weight %), if necessary, with addition of a solvent, a molecular weight controlling agent, a polymerization initiator and the like, to form rubber particles containing the rubber composition dispersed therein, and to continue polymerization to 10 to 40% conversion degree of styrene monomer. The rubber forms a continuous phase until the rubber particles are formed. Further, the polymerization continues through phase conversion step (granulation step), in which dispersion phase of rubber particles is formed, to attain 50 to 99% conversion degree, thus forming the HIPS polymer.

The dispersed particles (rubber particles) of the rubber-like polymer in the present invention are dispersed in a resin and are formed of a rubber-like polymer and a polystyrene resin. The polystyrene resin is graft-bonded with the rubber-like polymer or occluded in the rubber-like polymer without being graft-bonded therewith. The dispersed particles of the rubber-like polymer in the present invention having particle diameter of 0.3 to 10 μm, preferably 0.5 to 8 μm can be produced. In order to improve the environmental stress-cracking resistance (ESCR), the dispersed particles of the rubber-like polymer having particle diameter of 0.3 to 15 μm, preferably 0.5 to 10 μm can be suitably produced.

In the present invention, the production process may be also a batch process or a continuous process, and is not limited.

The styrene polymer, which constitutes a continuous phase of the HIPS polymer of the present, invention, has a weight-average molecular weight of preferably 50,000 or more, particularly preferably 100,000 to 400,000.

In the present invention, the raw solution containing mainly the above-described rubber-like polymer is polymerized in a complete mixing type reaction vessel. The complete mixing type reaction vessel may be any vessel in which the raw solution is kept in a uniform mixing state. A preferable vessel is one provided with an agitating blade such as a helical ribbon, double helical ribbon, anchor and the like. The agitating blade of a helical ribbon type is preferably provided with a draft tube in order to promote the circulation between upper and lower portions in the reaction vessel.

The styrene monomer used in the present invention includes styrene; a side-chain alkyl-substituted styrene such as α-methyl styrene and α-ethyl styrene; a nucleus alkyl-substituted styrene such as monochlorostyrene, dichlorostyrene, vinyl toluene, vinyl xylene, o-t-butylstyrene, p-t-butyl-styrene and p-methylstyrene; a styrene halide such as tribromostyrene, tetrabromostyrene and the like; p-hydroxystyrene; o-methoxystyrene; vinylhaphthalene; and the like. Styrene and α-methyl styrene are particularly preferred. One or more kinds of these styrene monomers can be used.

If necessary, known additives can be added to the HIPS polymer of the present invention during production or after production of the HIPS polymer. The known additives include an anti-oxidation agent, a stabilizing agent such as an UV absorbing agent and the like; a mold release agent, a lubricant, a coloring agent, various fillers, various plasticizer, higher aliphatic acid, an organic polysiloxane, a silicone oil, a flame retarder, an antistatic agent, a blowing agent and the like. The rubber-reinforced styrene resin composition of the present invention can be applied to known various molded articles and is suitable for injection molding employed in electric, and industrial fields since it is excellent in flame retardancy, impact resistance, and tensile strength.

It can be applied to various uses for housing of domestic and industrial appliance for a television, an air conditioner, a refrigerator, a facsimile, telephone and the like; and for a film and sheet used as a wrapping material, food container and the like. Further, high cis-high vinyl polybutadiene can be applied to a tire use for an automobile, and non-tire use for a golf bail, a shoe sole and the like.

EXAMPLE

Examples of the present invention are now described specifically below. The present invention is not limited to these Examples.

The following properties are measured as described below. Dispersion condition of a polymerization inhibitor in an autoclave; Mooney viscosity ($ML_{1+4}$, at 100° C.); Toluene solution viscosity (Tcp); Number-average molecular weight (Mn); Weight-average molecular weight (Mw); Molecular weight distribution (Mw/Mn); Gel content; Yellow index (YI); APHA color; Microstructure; Cold flow speed (CF); St-cp; Particle diameter of rubber; Graft rate; Swelling degree; Charpy impact strength; Environmental stress-cracking resistance (ESCR); TEM; Appearance (fish-eye); Appearance (hue); Dupont impact strength.

The dispersion condition of a polymerization inhibitor in an autoclave was measured by taking a photograph from the bottom of the autoclave, and determining the maximum length (cut length) and minimum length (cut length) passing the center of mass of the polymerization inhibitor particle from the photograph using Win ROOF software for image analysis produced by MITANI CORPORATION.

The Mooney Viscosity ($ML_{1+4}$) at 100° C. was measured in accordance with the method specified in JIS K 6300.

The toluene solution viscosity (Tcp) was measured by dissolving 2.28 g of the polymer in 50 ml of toluene, followed by measuring the viscosity of the solution at 25° C. using a Cannon-Fenske viscometer and a standard solution for calibration viscometer (JIS Z8809).

The number-average molecular weight (Mn), weight-average molecular weight (Mw), and molecular weight distribution (Mw/Mn) were determined by HLC-8220 GPC produced by Tosoh Corporation using two columns in series and standard calibration line of polystyrene. The columns used were Shodex GPC KF-805L columns and measurement was carried out at a column temperature of 40° C. in THF.

The gel content (insoluble matter in toluene) means a gel matter deposited on a 200 mesh wire cloth when 10 g of a sample rubber was dissolved in 400 ml of toluene contained in an Erlenmeyer flask, and thus formed solution was filtered by using a filter provided the 200 mesh wire cloth. The gel content is a value obtained by measuring the amount of dried gel matter deposited on the wire cloth, with the value being determined by percentage based on the sample rubber.

The yellow index (YI) of the polybutadiene was measured by NDJ-300A produced by Nippon Denshoku Industries Co., Ltd.

The APHA color was measured for a 5% solution obtained by dissolving a rubber in a styrene monomer according to ASTM D1209.

The microstructure was measured by an infrared absorption spectrum analysis. The microstructure was determined from the ratios of absorption intensities of cis740 $cm^{-1}$, trans967 $cm^{-1}$, and vinyl910 $cm^{-1}$.

The cold flow speed (CF) was determined by measuring the amount of the aspirated polymer per 1 minute maintained at a temperature of 50° C. and aspirated for 10 minutes into a glass tube having an inner diameter of 6.4 mm by means of pressure difference of 180 mmHg.

The St-cp is a viscosity (centipoise) at a temperature of 25° C. of the solution obtained by dissolving 5 g of rubber-like polymer in 95 g of styrene monomer.

Regarding to the particle diameter of rubber, a rubber-reinforced styrene-acrylonitrile copolymer (ABS polymer) or rubber-reinforced styrene resin (HIPS polymer) was dissolved in dimethyl formamide to dissolve only polystyrene portion constituting a matrix and contained in a resin, and a part of the solution was dispersed in an electrolyte formed of dimethyl formamide solvent and ammonium thiocyanate dispersant to determine the volume-average particle diameter, the standard deviation of volume-average particle diameter, the number-average particle diameter, and the standard deviation of number-average particle diameter, of the rubber particles, using Coulter counter produced by Beckman Coulter, Inc., Multicider III.

The graft rate (=[MEK/AC-inso·(g)–R(g)]×100/R(g)) was determined as follows: 1 g of ABS polymer or HIPS polymer was added to 50 ml of a mixed solution containing methylethylketone and acetone of weight ratio 1/1. The mixture was stirred violently for 1 hour to swell and dissolve the polymer in the mixed solution. Then, the mixture was subjected to centrifugal separation by a centrifugal separator to precipitate an insoluble matter, and to decantation to throw away the supernatant liquid. Thus obtained insoluble matter in methylethylketone/acetone was subjected to vacuum drying at a temperature of 50° C., was cooled in a desiccator, and was weighed to determine the weight of the insoluble matter of methylethylketone/acetone (MEK/AC-insol. (g)). Based on the value, the graft rate was determined in consideration of the amount of the rubber-like polymer (R (g)) calculated from the content of the rubber-like polymer.

In the case of an ABS polymer, the swelling degree was determined as follows: 1 g of ABS polymer was added to 50 ml of a mixed solution containing methylethylketone and toluene of weight ratio 1/1. The mixture was stirred violently for 1 hour to swell and dissolve the polymer in the mixed solution. Then, the mixture was subjected to centrifugal separation by a centrifugal separator to precipitate an insoluble matter, and to decantation to throw away the supernatant liquid. Thus obtained precipitated portion (wet weight of swelled matter) was weighed, vacuum-dried at a temperature of 100° C., cooled in a desiccator, and weighed to determine the swelling degree as a weight ratio of swelled mass/dried mass.

In the case of an HIPS polymer, the swelling degree was determined as follows: 1 g of HIPS polymer was added to 50 ml of toluene. The mixture was stirred violently for 1 hour to swell and dissolve the polymer in toluene. Then, the mixture was subjected to centrifugal separation by a centrifugal separator to precipitate an insoluble matter, and to decantation to throw away the supernatant liquid. Thus obtained precipitated portion (wet weight of swelled matter) was weighed, vacuum-dried at a temperature of 100° C., cooled in a desiccator, and weighed to determine the swelling degree as a weight ratio of swelled mass/dried mass.

The Charpy impact strength was measured according to JIS K7111 (with notch). The tensile properties, namely yield strength and breaking strength were measured according to JIS K7113. The gross was measured according to JIS 28742 (Incident angle of 60° C.).

The environmental stress-cracking resistance (ESCR) was determined as follows: a tensile test piece (No. 1 type test, piece) was left at a temperature of 23° C. for 72 hours, and was subjected to tensile test (JIS K 7113) to measure a breaking extension ($EB_{cp}$). ESCR was evaluated by a retention of elongation ($EB_{cp}/EB_o$) from the test results and the value of the breaking extension ($EB_o$) measured on the ordinary tensile test. It can be evaluated that the higher the retention of elongation, the more excellent the solvent resistance and ESCR property.

TEM was evaluated as follows: ABS polymer or HIPS polymer was pelletized by an extruder and thus formed pellets were surface-shaped by ultramicrotome, subjected to vapor dyeing by metal oxide, and cut into ultra-thin sections. The ultra-thin sections were observed by 7100FA type TEM produced by Hitachi Ltd.

Appearance (fish-eye) was evaluated as follows: A sheet (width: 65 mm, length: 600 mm, thickness: 0.5 mm) was formed by extrusion, fish-eyes on the sheet were counted, and evaluation is performed by the following standard.

o: little (5 or less as a guideline), □: relatively much (6 or more as a guideline), x: much (15or more as a guideline)

Appearance (hue) was evaluated as follows: ABS polymer or HIPS polymer was pelletized by an extruder and yellow index (YI) of thus formed pellets was measured, and evaluation is performed by the following standard. The yellow index was measured by NDJ-300A produced by Nippon Denshoku Industries Co., Ltd.

o: YI=5 or less, □: YI=6 or more

Dupont impact strength was represented as 50% breaking energy measured by Dupont drop-weight test.

(Production of Polybutadiene)

Example 1

The content of a 1.5-L (content volume) autoclave for polymerization was purged with nitrogen, 1 L of a raw mixed solution consisting of 20 wt. % of cyclohexane, 40 wt. % of butadiene and 40 wt % of butene was charged in the autoclave, followed by stirring. Then, 19 μL of water was added, followed by stirring at 500 rpm for 30 minutes. Then, 120 mL of hydrogen reduced to a volume at 20° C., 1 atm., metered by an integrating mass flow meter, was introduced into the autoclave, followed by adding 1.6 mmol of triethyl aluminum (TEA) and stirring for 5 minutes. Thereafter, 6.8 μmol of vanadiumoxy(cyclopentadienyl)dichloride ($CpV(O)Cl_2$) and 10.2 μmol of triphenylcarbenium tetrakis(pentafluorophenyl) borate ($Ph_3CB(C_6F_5)_4$) were added in order to the toluene solution to conduct polymerization at a temperature of 50° C. at 500 rpm for 30 minutes. Then, 0.2355 mmol of 4,6-bis (octylmethyl)-O-cresol (cas-number: 110553-27-0) was added, followed by stirring for 1 minute. Then, 6 mL of water was added as a reaction inhibitor, followed by stirring by means of helical type stirring blade at 700 rpm for 1 minute. Thereafter, the mixed solution was dried to evaporate the solvent and water to obtain the polybutadiene of Example 1. The physical properties of the polybutadiene are shown in Table 1.

Example 2

The polybutadiene of Example 2 was obtained in the same manner as in Example 1 except that 100 mL of water was added as a reaction inhibitor, followed by stirring at 700 rpm for 1 minute.

Example 3

The polybutadiene of Example 3 was obtained in the same manner as in Example 1 except that 130 mL of water was added as a reaction inhibitor, followed by stirring at 700 rpm for 1 minute.

Example 4

The polybutadiene of Example 4 was obtained in the same manner as in Example 1 except that 6 mL of ethanol was added as a reaction inhibitor, followed by stirring at 700 rpm for 1 minute.

Comparative Example 1

The polybutadiene of Comparative Example 1 was obtained in the same manner as in Example 1 except that 150 mL of v/ater was added as a reaction inhibitor, followed by stirring at 700 rpm for 1 minute.

Comparative Example 2

The polybutadiene of Comparative Example 2 was obtained in the same manner as in Example 1 except that 130 mL of water was added as a reaction inhibitor, followed by stirring at 500 rpm for 1 minute.

These results are shown in the following Table 1. In addition to the polybutadienes of Examples 1-4, Comparative Examples 1-2, a commercial low cis rubber (Diene 55AE: produced by Asahi Kasei Corp.) and a commercial high cis rubber (UBEPOL BR14H: produced by Ube Industries, Ltd.) were prepared. The properties of these commercial rubbers are shown similarly in the Table.

Example 5

Next, the ABS polymer composition of Example 5 was produced using the polybutadiene of Example 1. Content of a 1.5-L autoclave provided with a stirrer was purged with nitrogen. 50 g of the polybutadiene of Example 1 was dissolved in 372 g of styrene and 90 g of acrylonitrile. Then, 0.1 g of n-dodecyl mercaptan and 0.12 g of t-butylperoxy pivalate were added, followed by stirring at a temperature of 75° C. to conduct prepolymerization for 1.5 hours till 14% of conversion degree has been achieved. Subsequently, 500 mL of 0.5 wt. % aqueous solution of polyvinyl alcohol was poured into the prepolymerization liquid, followed by adding 1.0 g (0.2 weight part) of benzoyl peroxide and 1.0 g (0.2 weight part) of dicumyl peroxide to conduct polymerization continuously during stirring at a temperature of 100° C. for 2 hours and then at a temperature of 125° C. for 2 hours. The polymerization mixture was cooled to a room temperature and filtered to obtain a beads-like polymer, followed by water-washing and drying. The dried matter was subjected to extrusion by extruder to palletize, thus obtaining an impact resistant ABS polymer. The obtained ABS polymer composition were subjected to injection molding to prepare sample pieces for measurement of physical properties, followed by measuring the physical properties of the sample pieces. The results are shown in Table 2.

TABLE 1

| | | | Example 1 | Example 2 | Example 3 | Example 4 | Comparative Example 1 | Comparative Example 2 | Low cis | High cis |
|---|---|---|---|---|---|---|---|---|---|---|
| Termination conditions of reaction | Stirring speed of polymerization inhibiting water | rpm | 700 | 700 | 700 | 700 | 700 | 500 | | |
| | Amount of polymerization inhibiting water | vol % | 0.6 | 10 | 13 | 0.6 | 15 | 13 | | |
| | | ml | Water 6 ml | Water 100 ml | Water 130 ml | Ethanol 6 ml | Water 150 ml | Water 130 ml | | |
| | Blade shape | | Helical | Helical | Helical | Helical | Helical | Helical | | |
| | Solvent dilution | | None | None | None | None | None | None | | |
| Maximum cut length of water particle | | mm | 19.4 | 62.4 | 134.7 | 16.9 | Continuous phase | Continuous phase | | |
| Solid viscosity | | ML | 40.0 | 41.6 | 37.3 | 39.5 | 48.2 | 45.4 | 53.0 | 33.0 |
| Color | Appearance | | Colorless | Colorless | Light yellow | Colorless | Dark yellow | Dark yellow | Colorless | Colorless |
| | APHA | | 10 | 10 | 20 | 10 | 25 | 25 | 10 | 10 |
| | YI | | 8.4 | 7.8 | 10.2 | 6.8 | 24.8 | 23.2 | | |
| Gel | Gel content | wt % | 0.003 | 0.004 | 0.002 | 0.003 | 0.062 | 0.009 | 0.002 | 0.003 |
| Solution viscosity | Top | | 108.4 | 116.5 | 106.3 | 107.8 | 144.6 | 131.7 | 133.0 | 43.0 |
| | Top/ML | | 2.7 | 2.8 | 2.8 | 2.7 | 3.0 | 2.9 | 2.5 | 1.3 |
| | Step | | 140.9 | 151.5 | 138.2 | 140.1 | 188.0 | 171.2 | 183.0 | 58.0 |
| Molecular weight | Mn | *10000 | 22.2 | 21.7 | 23 | 21.8 | 21.7 | 21.9 | 19.4 | 14.7 |
| | Mw | *10000 | 50.4 | 50.1 | 52.9 | 48.8 | 63.5 | 56.1 | 45.3 | 40.8 |
| | Mw/Mn | | 2.27 | 2.31 | 2.30 | 2.24 | 2.93 | 2.56 | 2.34 | 2.78 |
| Cold flow | CF | mg/min | 33 | 34 | 36 | 33 | 27 | 27 | 22 | 18 |
| Microstructure | Cis | % | 86.5 | 87.2 | 87.5 | 86.6 | 88.4 | 87.7 | 37.2 | 97.1 |
| | Vinyl | % | 11.8 | 11.6 | 11.3 | 11.7 | 10.3 | 11.1 | 9.4 | 1.1 |
| | Trans | % | 1.7 | 1.2 | 1.2 | 1.7 | 1.3 | 1.2 | 53.4 | 1.8 |

As shown in Table 1, the polybutadienes of Examples 1-4 have narrower molecular weight distribution, lower gel content, and lower APHA color than those of Comparative Examples 1-2.

(Production of ABS polymer (Containing Unmodified Polybutadiene))

Example 6

The ABS polymer composition was produced in the same manner as in Example 5 except, that the polybutadiene of Example 2 was used instead of the polybutadiene of Example 1. The physical properties thereof are also shown in Table 2.

Example 7

The ABS polymer composition was produced in the same manner as in Example 5 except that the polybutadiene of Example 3 was used instead of the polybutadiene of Example 1. The physical properties thereof are also shown in Table 2.

Comparative Example 3

The ABS polymer composition was produced in the same manner as in Example 5 except that the polybutadiene of Comparative Example 1 was used instead of the polybutadiene of Example 1. The physical properties thereof are also shown in Table 2.

Comparative Example 4

The ABS polymer composition was produced in the same manner as in Example 5 except that the polybutadiene of Comparative Example 2 was used instead of the polybutadiene of Example 1. The physical, properties thereof are also shown in Table 2.

Comparative Examples 5, 6

The ABS polymer composition was produced in the same manner as in Example 5 except that the commercial low cis rubber (Diene 55AE: produced by Asahi Kasei Corp.) and the commercial high cis rubber (UBEPOL BR14H: produced by Ube Industries, Ltd.) were used instead of the polybutadiene of Example 1. The physical properties thereof are also shown in Table 2.

ABS polymer composition is good. Further, since the polybutadiene having a gel content of 0.06 wt % or less in the Examples is used, the fish-eye of the ABS polymer compositions can be reduced. Namely, the ABS polymer compositions have a high gross, high impact resistance, good appearance (hue), and low fish-eye.

On the other hand, it is generally known that the impact resistant strength to the particle diameter has an optimal point. Since, when the polybutadiene of Example 1 is employed in the same condition (stirring speed), the particle diameter becomes small as compared with those of Comparative Examples, a margin for producing the particles having an objective diameter becomes large by controlling the stirring speed, and the optimal particle diameter for the impact resistant strength can be attained with uniform particle size at a low rotating speed. This is very advantageous to power of a motor and the like.

Further, since the ABS polymer compositions of the Examples have an increased impact resistant strength, they necessitate smaller amount of rubber as compared with those of the Comparative Examples in order to obtain the same impact resistant strength. Thus, since usage of rubber can be reduced in spite of maintaining the physical properties, it is possible not only to obtain a cost merit, but also to lower the viscosity of rubber-styrene solution and to reduce stirring power because the amount of the rubber is low. Further, since, the amount, of rubber is reduced, the fluidity of the resin is increased to improve the productivity. Reducing the amount of rubber means reducing the number of replacement time of a gel filter in the rubber-dissolving vessel, which is a secondary merit to be enjoyed.

TABLE 2

| | Rubber used | | Example 5 Example 1 | Example 6 Example 2 | Example 7 Example 3 | Comparative Example 3 Comparative Example 1 | Comparative Example 4 Comparative Example 2 | Comparative Example 5 Low-cis | Comparative Example 6 High-cis |
|---|---|---|---|---|---|---|---|---|---|
| Pre-polymerized conditions | Stirring speed | rpm | 600 | 600 | 600 | 600 | 600 | 600 | 600 |
| Measurement results of physical properties | Volume-average particle diameter | μm | 1.32 | 1.44 | 1.18 | 2.37 | 1.76 | 1.82 | 2.45 |
| | Standard deviation of particle diameter | μm | 1.75 | 2.03 | 1.48 | 2.69 | 2.33 | 2.54 | 2.31 |
| | Charpy impact strength | KJ/m$^2$ | 17.6 | 17.4 | 16.8 | 14 | 17.2 | 12.3 | 12 |
| | Gross | % | 75.4 | 69.3 | 82.1 | 41.7 | 54.3 | 37.6 | 44.9 |
| | Graft rate | wt % | 152 | 161 | 142 | 163 | 155 | 123 | 122 |
| | Dupont impact strenght | Kg · cm | 49 | 52 | 50 | 42 | 47 | 44 | 39 |
| | Swelling degree | wt % | 9.6 | 9.4 | 9.6 | 8.9 | 9.3 | 9 | 8.8 |
| | Appearance (Fish-eye) | | ○ | ○ | ○ | X | Δ | ○ | ○ |
| | Appearance (Hue) | | ○ | ○ | ○ | Δ | Δ | ○ | ○ |

As described above, when the sizes of the particles in the ABS polymers obtained by polymerization in the same stirring conditions are compared, it has been found that the ABS polymers of the Examples have small particle diameter and small standard deviation. Namely, the ABS polymers having uniform particle diameter can be obtained. These are estimated from the results of the particle diameters measured by Couter counter. As a result, the ABS polymers of the Examples have a low turbulence of reflective light and very excellent gross. Further, in the Examples, the graft rate to particle diameter is excellent (though ordinarily small diameter of the rubber particles brings about low graft rate, high reactivity beyond ordinary slope is shown.) and the swelling degree is also high. As a result, also the impact, strength is excellent. Furthermore, since the APHA color of the polybutadiene can be suppressed to 20or less, the appearance of the (Production of HIPS Polymer (Containing Unmodified Polybutadiene))

Example 8

Next, the HIPS polymer of Example 8 was produced using the polybutadiene of Example 1. Content of a 1.5-L autoclave provided with a stirrer was purged with nitrogen. 28 g of the polybutadiene of Example 1 was dissolved in 372 g of styrene. Then, 0.08 g of n dodecyl mercaptan was added, followed by stirring at a temperature of 135° C. to conduct prepolymerization for 80 minutes till 30% of conversion degree has been achieved. Subsequently, 400 mL of 0.5 wt % aqueous solution of polyvinyl alcohol was poured into the prepolymerization liquid, followed by adding 0.8 g of benzoyl peroxide and 0.8 g of dicumyl peroxide to conduct polymerization continuously during stirring at a temperature of 100° C. for 2 hours, at a temperature of 125° C. for 3 hours, and then at a temperature of 140° C. for 2 hours. The polymerization mixture was cooled to a room temperature and filtered to obtain a beads-like polymer, followed by water-rubber (Diene 55AE: produced by Asahi Kasei Corp.) and the commercial high cis rubber (UBEPOL BR14H: produced by Ube Industries, Ltd.) were used instead of the polybutadiene of Example 1. The physical properties thereof are also shown in Table 3.

TABLE 3

| | | Rubber used | Example 8 Example 1 | Example 9 Example 2 | Example 10 Example 3 | Comparative Example 7 Comparative Example 1 | Comparative Example 8 Comparative Example 2 | Comparative Example 9 Low-cis | Comparative Example 10 High-cis |
|---|---|---|---|---|---|---|---|---|---|
| Per-polymerized conditions | Stirring speed | rpm | 600 | 600 | 600 | 600 | 600 | 600 | 600 |
| Measurement results of physical properties | Volume-average particle diameter | μm | 2.02 | 2.34 | 1.97 | 3.05 | 2.55 | 2.92 | 2.59 |
| | Standard deviation of particle diameter | μm | 0.69 | 0.75 | 0.64 | 2.13 | 1.28 | 1.3 | 1.27 |
| | Charpy impact strength | KJ/m² | 7.4 | 7.3 | 7.1 | 5.7 | 6.2 | 6 | 6.5 |
| | Gross | % | 71.3 | 68.1 | 72.9 | 31.7 | 44.3 | 38.1 | 53.8 |
| | Graft rate | wt % | 274 | 278 | 264 | 285 | 275 | 275 | 233 |
| | Dupont impact strenght | Kg · cm | 39 | 37 | 38 | 33 | 35 | 32 | 26 |
| | Swelling degree | wt % | 9.9 | 9.6 | 10.2 | 9.5 | 9.7 | 9.2 | 9.9 |
| | Appearance (Fish-eye) | | ○ | ○ | ○ | X | Δ | ○ | ○ |
| | Appearance (Hue) | | ○ | ○ | ○ | Δ | Δ | ○ | ○ | washing and drying. The dried matter was subjected to extrusion by extruder to pelletize, thus obtaining an impact resistant HIPS polymer. The obtained HIPS polymer composition was subjected to injection molding to prepare sample pieces for measurement of physical properties, followed by measuring the physical properties of the sample pieces. The results are shown in Table 3.

Example 9

The HIPS polymer composition was produced in the same manner as in Example 8 except that the polybutadiene of Example 2 was used instead of the polybutadiene of Example 1. The physical properties thereof are also shown in Table 3.

Example 10

The HIPS polymer composition was produced in the same manner as in Example 8 except, that the polybutadiene of Example 3 was used instead of the polybutadiene of Example 1. The physical properties thereof are also shown in Table 3.

Comparative Example 7

The HIPS polymer composition was produced in the same manner as in Example 8 except that the polybutadiene of Comparative Example 1 was used instead of the polybutadiene of Example 1. The physical properties thereof are also shown in Table 3.

Comparative Example 8

The HIPS polymer composition was produced in the same manner as in Example 8 except that the polybutadiene of Comparative Example 2 was used instead of the polybutadiene of Example 1. The physical properties thereof are also shown in Table 3.

Comparative Examples 9, 10

The HIPS polymer composition was produced in the same manner as in Example 8 except that the commercial low cis As described above, when the sizes of the particles in the HIPS polymer compositions obtained by polymerization in the same stirring conditions are compared, it has been found that the HIPS polymer compositions of the Examples have small particle diameter and small standard deviation. Namely, the HIPS polymer compositions having uniform particle diameter can be obtained. These are estimated from the results of the particle diameters measured by Coulter counter. As a result, the HIPS polymers of the Examples have a low turbulence of reflective light and very excellent gross. Further, in the Examples, the graft rate to particle diameter is excellent (though ordinarily small diameter of the rubber particles brings about low graft rate, high reactivity beyond ordinary slope is shown.) and the swelling degree is also high. As a result, also the impact strength is excellent. Furthermore, since the APHA color of the polybutadiene can be suppressed to 20 or less, the appearance of the HIPS polymer composition is good. Further, since the polybutadiene having a gel content of 0.06 wt. % or less in the Examples is used, the fish-eye of the HIPS polymer compositions can be reduced. Namely, the HIPS polymer compositions have a high gross, high impact resistance, good appearance (hue), and low fish-eye.

On the other hand, it is generally known that the impact resistant strength to the particle diameter has an optimal point. Since, when the polybutadiene of Example 1 is employed in the same, condition (stirring speed), the particle diameter becomes small as compared with those of Comparative Examples, a margin for producing the particles having an objective diameter becomes large, and the optimal particle diameter for the impact, resistant, strength can be attained with uniform particle size at a low rotating speed. This is very advantageous to power of a motor and the like.

Further, since the HIPS polymer compositions of the Examples have an increased impact resistant strength, they necessitate smaller amount of rubber as compared with those of the Comparative Examples in order to obtain the same impact resistant strength. Thus, since usage of rubber can be reduced in spite of maintaining the physical properties, it is possible not only to obtain a cost merit, but also to lower the viscosity of rubber-styrene solution and to reduce stirring power because the amount of rubber is low. Further, since the amount of rubber is reduced, the fluidity of the resin is increased to improve the productivity. Reducing the amount of rubber means reducing the number of replacement time of a gel filter in the rubber-dissolving vessel, which is a secondary merit to be enjoyed.

polybutadiene (Diene 55AE: produced by Asahi Kasei Kogyou Ltd.), high cis polybutadiene-1 (UBEPOL BR14H: produced by Ube Industries, Ltd.), and high cis polybutadiene-2 (trial product: produced by Ube Industries, Ltd.) were shown in Table 4.

TABLE 4

| | | | Synthesis Example 1 | Synthesis Example 2 | Synthesis Example 3 | Low-cis | High-cis-1 | High-cis-2 |
|---|---|---|---|---|---|---|---|---|
| Mooney viscosity | | $ML_{1+4,\ 100°\ C.}$ | 42 | 32 | 51 | 54 | 33 | 33 |
| Microstructure | Cis-1,4-structure | % | 86 | 87 | 86 | 37 | 97 | 97 |
| | 1,2-bonded structure | % | 12 | 11 | 12 | 9 | 1 | 1 |
| 5 wt % styrene solution viscosity (at 25° C.) | | cp | 159 | 111 | 215 | 180 | 58 | 58 |
| 5 wt % toluene solution viscosity (at 25° C.) | | cp | 117 | 82 | 158 | 132 | 43 | 43 |
| Molecular weight and molecular weight distribution | Weight-average molecular weight | $\times 10^4$ | 49.6 | 46.9 | 55.8 | 43.8 | 40.8 | 40.8 |
| | Number-average molecular weight | $\times 10^4$ | 21.2 | 20.2 | 24.1 | 19.4 | 14.7 | 14.7 |
| | molecular weight distribution | Mw/Mn | 2.3 | 2.3 | 2.3 | 2.3 | 2.8 | 2.8 |
| | APHA color | | 10 | 15 | 15 | 10 | 15 | 25 |
| | Gel content | % | 0.002 | 0.003 | 0.003 | 0.002 | 0.003 | 0.003 |

(Production of ABS Polymer (Containing Unmodified Polybutadiene, ESCR Property)

Synthesis Example 1

Production of Polybutadiene

Content of a 1.5-L (content volume) autoclave for polymerization was purged with nitrogen. 1 L of a raw mixed solution consisting of 20 wt. % of cyclohexane, 40 wt. % of butadiene and 40 wt. % of butene was charged in the autoclave, followed by stirring. Then, 19 µL of water was added, followed by stirring for 30 minutes. Then, 110 mL of hydrogen reduced to a volume at 20° C., 1 atm., metered by an integrating mass flow meter, was introduced into the autoclave, followed by adding 1.6 mmol of triethyl aluminum (TEA) and stirring for 5 minutes. Thereafter, 6.8 µmol of vanadiumoxy(cyclopentadienyl)dichloride ($CpV(O)Cl_2$) and 10.2 µmol of triphenylcarbenium tetrakis(pentafluorophenyl) borate ($Ph_3CB(C_6F_5)_4$) were added in order to the toluene solution to conduct polymerization at a temperature of 50° C. for 30 minutes. Then, 4,6-bis(octylmethyl)-o-cresol was added, followed by stirring for 1 minute. Then, 8 mL of water was added as a reaction inhibitor, followed by stirring for 1 minute. Thereafter, the mixed solution was dried to evaporate the solvent and water to obtain the polybutadiene of Synthesis Example 1.

Synthesis Example 2

The polybutadiene of Synthesis Example 2 was obtained by conducting polymerization in the same manner as in Synthesis Example 1 except that 125 mL of hydrogen was added.

Synthesis Example 3

The polybutadiene of Synthesis Example 3 was obtained by conducting polymerization in the same manner as in Synthesis Example 1 except that 90 mL of hydrogen was added.

The physical properties including microstructure of polybutadiene of Synthesis Example 1, general-purpose low cis Example 11

Next, the ABS polymer composition of Example 11 was produced using the polybutadiene of Synthesis Example 1, Content of a 1.5-L autoclave provided with a stirrer was purged with nitrogen. The polybutadiene (50 g) of Synthesis Example 1 was dissolved in styrene (360 g) and acrylonitrile (90 g). Then, 0.1 g of n-dodecyl mercaptan and 0.1 g of t-butylperoxy pivalate were added, followed by stirring at a temperature of 75° C. to conduct prepolymerization for 90 minutes till 13% of conversion degree of styrene-acrylonitrile copolymer has been achieved. Subsequently, 500 mL of 0.5 wt. % aqueous solution of polyvinyl alcohol was poured into the prepolymerization liquid, followed by adding 1.0 g of benzoyl peroxide and 1.0 g of dicumyl peroxide to conduct polymerization continuously during stirring at a temperature of 100° C. for 2 hours and then at a temperature of 125° C. for 2 hours. The polymerization mixture was cooled to a room temperature and filtered to obtain a beads-like polymer, followed by water-washing and drying. The dried matter was subjected to extrusion by extruder to pelletize, thus obtaining 450 g of ABS polymer. The obtained ABS polymer composition were subjected to injection molding to prepare sample pieces for measurement, of physical properties, followed by measuring the physical properties of the sample pieces. The results are shown in Table 5. The tensile properties after evaluation of ESCR are expressed as relative values when the value in Example 11 was taken as 100. The tensile properties after evaluation of ESCR are determined by the product of tensile elongation and tensile elongation retention of after contact with cyclopentane.

Example 12

The ABS polymer composition was produced in the same manner as in Example 11 except that the raw polybutadiene of Synthesis Example 2 was used.

Example 13

The ABS polymer composition was produced in the same manner as in Example 11 except that the raw polybutadiene of Synthesis Example 3 was used.

Comparative Example 11

The ABS polymer composition was produced in the same manner as in Example 11 except that the low cis polybutadiene shown in Table 4 was used as a raw polybutadiene.

Comparative Example 12

The ABS polymer composition was produced in the same manner as in Example 11 except that the high cis polybutadiene-1 shown in Table 4 was used as a raw polybutadiene.

Comparative Example 13

The ABS polymer composition was produced in the same manner as in Example 11 except that the high cis polybutadiene-2 shown in Table 4 was used as a raw polybutadiene.

Example 14

Next, the ABS polymer composition of Example 14 was produced using the polybutadiene of Synthesis Example 1 and general-purpose low cis polybutadiene rubber. Content of a 1.5-L autoclave provided with a stirrer was purged with nitrogen. 25 g of the polybutadiene of Synthesis Example 1 and 25 g of the general-purpose low cis polybutadiene rubber were dissolved in 360 g of styrene and 90 g of acrylonitrile. Then, 0.1 g of n-dodecyl mercaptan and 0.1 g of t-butylperoxy pivalate were added, followed by stirring at a temperature of 75° C. to conduct prepolymerization for 90 minutes till 13% of conversion degree of styrene-acrylonitrile copolymer has been achieved. Subsequently, 500 mL of 0.5 wt. % aqueous solution of polyvinyl alcohol was poured into the prepolymerization liquid, followed, by adding 1.0 g of benzoyl peroxide and 1.0 g of dicumyl peroxide to conduct polymerization continuously during stirring at a temperature of 100° C. for 2 hours and then at a temperature of 125° C. for 2 hours. The polymerization mixture was cooled to a room temperature and filtered to obtain a beads-like polymer, followed by water-washing and drying. The dried matter was subjected to extrusion by extruder to palletize, thus obtaining 450 g of ABS polymer. The obtained ABS polymer was subjected to injection molding to prepare sample pieces for measurement of physical properties, followed by evaluating the physical properties thereof. The results are shown in Table 5.

Example 15

The ABS polymer composition was produced in the same manner as in Example 14 except that the amount of the polybutadiene of Synthesis Example 1 was 37.5 g, and the amount of low cis polybutadiene rubber was 12.5 g.

Example 16

The ABS polymer composition was produced in the same manner as in Example 14 except that the amount of the polybutadiene of Synthesis Example 1 was 12.5 g, and the amount of low cis polybutadiene rubber was 37.5 g.

Example 17

The ABS polymer composition was produced in the same manner as in Example 14 except that high cis polybutadiene rubber was used as a diene rubber excluding the polybutadiene of Synthesis Example 1.

TABLE 5

| | | Rubber used | Example 11 Synthesis Example 1 | Example 12 Synthesis Example 2 | Example 13 Synthesis Example 3 | Comparative Example 11 Low-cis | Comparative Example 12 High-cis-1 | Comparative Example 13 High-cis-2 | Example 14 Synthesis Example 1/ Low cis | Example 15 Synthesis Example 1/ Low cis | Example 16 Synthesis Example 1/ Low cis | Example 17 Synthesis Example 1/ High cis |
|---|---|---|---|---|---|---|---|---|---|---|---|---|
| Rubber amount | | % | 10 | 10 | 10 | 10 | 10 | 10 | 10(5/5) | 10(7.5/2.5) | 10(2.5/7.5) | 10(5/5) |
| Styrene/acrylonitrile ratio | | | 80/20 | 80/20 | 80/20 | 80/20 | 80/20 | 80/2 | 80/20 | 80/20 | 80/20 | 80/20 |
| Graft rate | | % | 154 | 151 | 155 | 150 | 135 | 132 | 153 | 153 | 151 | 151 |
| Swelling degree | | | 9 | 9 | 10 | 9 | 10 | 10 | 9 | 9 | 9 | 9 |
| Rubber particle diameter | | μm | 1.4 | 1.3 | 1.5 | 1.7 | 2.2 | 2.4 | 1.5 | 1.5 | 1.6 | 1.9 |
| Charpy impact strength | | kJ/m² | 17.2 | 17.4 | 17 | 13 | 16.2 | 15.9 | 17.1 | 17.2 | 16.8 | 17 |
| | | INDEX | 100 | 101 | 99 | 76 | 94 | 92 | | | | |
| Tensile properties | Yield strength | MPa | 47.5 | 49.6 | 45.3 | 47.1 | 45.3 | 44.7 | 49.8 | 49.5 | 48.9 | 48.1 |
| | Tensile strength | MPa | 39.6 | 39.2 | 38.8 | 41 | 39.5 | 39.6 | 42.8 | 42 | 41.8 | 40.9 |
| | tensile elongation | % | 33 | 26 | 34 | 34 | 36 | 37 | 38 | 37 | 36 | 38 |
| | ESCR properties (tensile elongation retention of cyclopentane) | % | 100 | 100 | 97 | 91 | 87 | 87 | 97 | 100 | 97 | 95 |
| | Tensile properties after ESCR test | INDEX | 100 | | | | | | 118 | 118 | 111 | 115 |
| Appearance (Hue) | | | ◯ | ◯ | ◯ | ◯ | ◯ | Δ | ◯ | ◯ | ◯ | ◯ |

(Production of HIPS Polymer (Containing Unmodified Polybutadiene, SSCR Property))

Synthesis Example 4

Production of Polybutadiene

Content of a 1.5-L (content volume) autoclave for polymerization was purged with nitrogen. 1 L of a raw mixed solution consisting of 20 wt % of cyclohexane, 40 wt % of butadiene and 40 wt % of butene was charged in the autoclave, followed by stirring. Then, 19 μL of water was added, followed by stirring for 30 minutes. Then, 125 mL of hydrogen reduced to a volume at 20° C., 1 atm., metered by an integrating mass flow meter, was introduced into the autoclave, followed by adding 1.6 mmol of triethyl aluminum (TEA) and stirring for 5 minutes. Thereafter, 6.8 μmol of vanadiumoxy(cyclopentadienyl)dichloride (CpV(O)Cl$_2$) and 10.2 μmol of triphenylcarbenium tetrakis(pentafluorophenyl) borate (Ph$_3$CB(C$_6$F$_5$)$_4$) were added in order to the toluene solution to conduct polymerization at a temperature of 50° C. for 30 minutes. Then, 4,6-bis(octylmethyl)-o-cresol was added, followed by stirring for 1 minute. After reaction, 8 mL of water was added as a reaction inhibitor, followed by stirring for 1 minute. Thereafter, the mixed solution was dried to evaporate the solvent and water to obtain the polybutadiene of Synthesis Example 4.

Synthesis Example 5

The polybutadiene of Synthesis Example 5 was obtained in the same manner as in Synthesis Example 4 except that 110 mL of hydrogen was added.

Synthesis Example 6

The polybutadiene of Synthesis Example 6 was obtained in the same manner as in Synthesis Example 4 except that 90 mL of hydrogen was added.

Synthesis Example 7

The polybutadiene of Synthesis Example 7 was obtained in the same manner as in Synthesis Example 4 except that 80 mL of hydrogen was added.

The physical properties including microstructure of polybutadiene of Synthesis Examples 4 to 7, general-purpose low cis polybutadiene (Diene 55AE: produced by Asahi Kasei Corp.) used for evaluation, high cis polybutadiene-1 (UBE-POL BR14K: produced by Ube Industries, Ltd.), and high cis polybutadiene-2 (trial product: produced by Ube Industries, Ltd.) were shown in Table 6.

TABLE 6

|  |  |  | Synthesis Example 4 | Synthesis Example 5 | Synthesis Example 6 | Synthesis Example 7 | Low-cis | High-cis-1 | High-cis-2 |
|---|---|---|---|---|---|---|---|---|---|
| Mooney viscosity |  | ML$_{1+4, 100° C.}$ | 32 | 42 | 51 | 77 | 54 | 33 | 33 |
| Microstructure | Cis-1,4-structure | % | 87 | 86 | 86 | 87 | 37 | 97 | 97 |
|  | 1,2-bonded structure | % | 11 | 12 | 12 | 11 | 9 | 1 | 1 |
| 5 wt % styrene solution viscosity (at 25° C.) |  | cp | 111 | 159 | 215 | 717 | 180 | 58 | 58 |
| 5 wt % toluene solution viscosity (at 25° C.) |  | cp | 82 | 117 | 158 | 527 | 132 | 43 | 43 |
| Molecular weight and molecular weight distribution | Weight-average molecular weight | ×10$^4$ | 46.9 | 49.6 | 55.8 | 87 | 43.8 | 40.8 | 40.8 |
|  | Number-average molecular weight | ×10$^4$ | 20.2 | 21.2 | 24.1 | 37.7 | 19.4 | 14.7 | 14.7 |
|  | molecular weight distribution Mw/Mn |  | 2.3 | 2.3 | 2.3 | 2.3 | 2.3 | 2.8 | 2.8 |
| APHA color |  |  | 15 | 10 | 15 | 15 | 10 | 15 | 25 |
| Gel content |  | % | 0.003 | 0.002 | 0.003 | 0.006 | 0.02 | 0.003 | 0.003 |

Example 18

Next, the HIPS polymer composition of Example 108 was produced using the polybutadiene of Synthesis Example 4. Content of a 1.5-L autoclave provided with a stirrer was purged with nitrogen. 40 g of the polybutadiene of Synthesis Example 4 was dissolved in 360 g of styrene. Then, 0.12 g of n-dodecyl mercaptan was added, followed by stirring at a temperature of 135° C. to conduct prepolymerization for 80 minutes till 30% of conversion degree of monomer has been achieved. Subsequently, 400 mL of 0.5 wt % aqueous solution of polyvinyl alcohol was poured into the prepolymerization liquid, followed by adding 0.8 g of benzoyl peroxide and 0.8 g of dicumyl peroxide to conduct polymerization continuously during stirring at a temperature of 100° C. for 2 hours, at a temperature of 125° C. for 3 hours, and then at a temperature of 140° C. for 2 hours. The polymerization mixture was cooled to a room temperature and filtered to obtain a beads-like polymer, followed by water-washing and drying. The dried matter was subjected to extrusion by extruder to pelletize, thus obtaining an impact resistant. HIPS polymer. The obtained HIPS polymer composition were subjected to injection molding to prepare sample pieces for measurement of physical properties, followed by measuring the physical properties thereof. The results are shown in Table 7.

Example 19

The HIPS polymer composition was produced in the same manner as in Example 18 except that the raw polybutadiene of Synthesis Example 5 was used.

Example 20

The HIPS polymer composition was produced in the same manner as in Example 18 except that the raw polybutadiene of Synthesis Example 6 was used.

Example 21

The HIPS polymer composition was produced in the same manner as in Example 18 except that the raw polybutadiene of Synthesis Example 7 was used.

Comparative Example 14

The HIPS polymer composition was produced in the same manner as in Example 18 except that the low cis polybutadiene shown in Table 6 was used as a raw polybutadiene.

Comparative Example 15

The HIPS polymer composition was produced in the same manner as in Example 18 except that the high cis polybutadiene-1 shown in Table 6 was used as a raw polybutadiene.

Comparative Example 16

The HIPS polymer composition was produced in the same manner as in Example 18 except that the high cis polybutadiene-2 shown in Table 6 was used as a raw polybutadiene.

Example 22

Next, the HIPS polymer composition of Example 22 was produced using the polybutadiene of Synthesis Example 5 and general-purpose low cis polybutadiene. Content of a 1.5-L autoclave provided with a stirrer was purged with nitrogen. 20 g of the polybutadiene of Synthesis Example 5 and 20 g of general-purpose low cis polybutadiene were dissolved in 360 g of styrene. Then, 0.12 g of n-dodecyl mercaptan was added, followed by stirring at a temperature of 135° C. to conduct prepolymerization for 80 minutes till 30% of conversion degree of monomer has been achieved. Subsequently, 400 mL of 0.5 wt % aqueous solution of polyvinyl alcohol was poured into the prepolymerization liquid, followed by adding 0.8 g of benzoyl peroxide and 0.8 g of dicumyl peroxide to conduct polymerization continuously during stirring at a temperature of 100° C. for 2 hours, at a temperature of 125° C. for 3 hours, and then at a temperature of 140° C. for 2 hours. The polymerization mixture was cooled to a room temperature and filtered to obtain a beads-like polymer, followed by water-washing and drying. The dried matter was subjected to extrusion by extruder to pelletize, thus obtaining an impact resistant HIPS polymer. The obtained HIPS polymer composition were subjected to injection molding to prepare sample pieces for measurement of physical properties, followed by measuring the physical properties thereof. The results are shown in Table 7. The tensile properties after evaluation of ESCR are expressed as relative values when the value in Example 19 was taken as 100. The tensile properties after evaluation of ESCR are determined by the product of tensile elongation and tensile elongation retention of after contact with cyclopentane.

Example 23

The HIPS polymer composition was produced in the same manner as in Example 22 except that the amount of the raw polybutadiene was 3.0 g, and the amount of low cis polybutadiene rubber was 10 g.

Example 24

The HIPS polymer composition was produced in the same manner as in Example 22 except that the amount of the raw polybutadiene was 10 g, and the amount of low cis polybutadiene rubber was 30 g.

Example 25

The HIPS polymer composition, was produced in the same manner as in Example 22 except that high cis polybutadiene rubber was used as a diene rubber excluding the raw polybutadiene,

TABLE 7

| | | Rubber used | Example 18 Synthesis Example 4 | Example 19 Synthesis Example 5 | Example 20 Synthesis Example 6 | Example 21 Synthesis Example 7 | Comparative Example 14 Low-cis | Comparative Example 15 High-cis-1 | Comparative Example 16 High-cis-2 | Example 22 Synthesis Example 1/ Low cis | Example 23 Synthesis Example 1/ Low cis | Example 24 Synthesis Example 1/ Low cis | Example 25 Synthesis Example 1/ High cis |
|---|---|---|---|---|---|---|---|---|---|---|---|---|---|
| Rubber amount | | % | 10 | 10 | 10 | 10 | 10 | 10 | 10 | 10 (5/5) | 10(7.5/ 2.5) | 10(2.5/ 7.5) | 10 (5/5) |
| Graft rate | | % | 270 | 279 | 293 | 319 | 259 | 220 | 218 | 267 | 268 | 263 | 251 |
| Swelling degree | | | 10 | 10 | 10 | 10 | 9 | 10 | 10 | 9 | 9 | 9 | 10 |
| Rubber particle diameter | | μm | 4 | 4.7 | 5.8 | 16 | 6 | 6 | 5.6 | 4.7 | 4.4 | 5.2 | 5.2 |
| Charpy impact strength | | kJ/m$^2$ | 7.2 | 7.2 | 7.1 | 5.8 | 6.5 | 7 | 7 | 7.1 | 7.2 | 7 | 7.1 |
| Tensile properties | Yield strength | MPa | 25.7 | 24.5 | 22.9 | 12.1 | 26 | 24.3 | 24.5 | 26.3 | 26.2 | 26.2 | 26.3 |
| | Tensile strength | MPa | 29 | 29 | 29 | 28 | 29 | 27 | 26.3 | 31.8 | 31.2 | 31.4 | 31.2 |
| | tensile elongation | % | 45 | 44 | 41 | 33 | 37 | 38 | 36 | 52 | 49 | 48 | 49 |
| | ESCR properties (tensile elongation retention after application of cyclopentane) | % | 98 | 98 | 100 | 88 | 81 | 63 | 69 | 98 | 100 | 98 | 94 |
| | Tensile | INDEX | | 100 | | | 68 | 54 | 56 | 116 | 111 | 107 | 104 |

TABLE 7-continued

| Rubber used | Example 18 Synthesis Example 4 | Example 19 Synthesis Example 5 | Example 20 Synthesis Example 6 | Example 21 Synthesis Example 7 | Comparative Example 14 Low-cis | Comparative Example 15 High-cis-1 | Comparative Example 16 High-cis-2 | Example 22 Synthesis Example 1/ Low cis | Example 23 Synthesis Example 1/ Low cis | Example 24 Synthesis Example 1/ Low cis | Example 25 Synthesis Example 1/ High cis |
|---|---|---|---|---|---|---|---|---|---|---|---|
| properties after ESCR test | | | | | | | | | | | |
| Appearance (Fish-eye) | ○ | ○ | ○ | Δ | ○ | ○ | ○ | ○ | ○ | ○ | ○ |
| Appearance (Hue) | ○ | ○ | ○ | ○ | ○ | ○ | Δ | ○ | ○ | ○ | ○ |

(Production of Modified Polybutadiene)

Example 26

Content of a 1.5-L content volume autoclave for polymerization was purged with nitrogen. 1 L of a raw mixed solution (20 wt. % of cyclohexane, 40 wt % of butadiene and 40 wt % of butene) was charged in the autoclave, followed by stirring. Then, 1.9 μL of water was added, followed by stirring for 30 minutes at 500 rpm. Then, 120 mL of hydrogen reduced to a volume at 20° C., 1 atm., metered by an integrating mass flow meter, was introduced into the autoclave, followed by adding 1.6 mmol of triethyl aluminum (TEA) and stirring for 5 minutes. Thereafter, 6.8 μmol of vanadiumoxy(cyclopentadienyl)dichloride ($CpV(O)Cl_2$) and 10.2 μmol of triphenylcarbenium tetrakis(pentafluorophenyl)borate ($Ph_3CB$ ($C_6F_5$)$_4$) were added in order to the toluene solution to conduct polymerization at a temperature of 50° C. for 30 minutes at 500 rpm.

300 mL of a raw mixed solution (2.0 wt % of cyclohexane, 40 wt % of butadiene and 40 wt % of butene) was charged in 500-mL content volume autoclave for maturing other than the above-described autoclave for polymerization, followed by adding 16 μL of water and stirring for 30 minutes. Then, 2.24 mmol of diethylaluminum chloride (DEAC) was added, followed by stirring for 3 minute to mature. The matured liquid was pumped to the autoclave for polymerization before termination of polymerization. After pumping and stirring for 1 minute, 1 μmol of cobalt octylate ($Co(Oct)_2$) was added to perform reaction at a temperature of 50° C. for 10 minutes at 500 rpm.

After reaction, 0.2355 mmol of 4,6-bis(octylmethyl) o-cresol (cas-number 110553-27-0) was added, followed by stirring for 1 minute. Then, 8 mL of water was added as a reaction inhibitor, followed by stirring by means of helical type stirring blade at 700 rpm for 1 minute. Thereafter, the mixed solution was dried to evaporate the solvent and water to obtain the modified polybutadiene of Example 26.

Incidentally, in Example 26, after a water and DEAC were added to the raw material in the autoclave for maturing, the matured liquid was introduced into the autoclave, for polymerization. However, the water, DEAC, and $Co(Oct)_2$ may be directly introduced into the autoclave for polymerization without employing the autoclave for maturing.

Example 27

The modified polybutadiene polymer of the Example 27 was produced by polymerization and modification in the same manner as in Example 26 except that 130 mL of water was added as a reaction inhibitor and stirred for 1 minute at 700 rpm.

Example 28

The modified polybutadiene polymer of the Example 28 was produced by polymerization and modification in the same manner as in Example 26 except that 162.5 mL of water was added as a reaction inhibitor and stirred for 1 minute at 700 rpm.

Example 29

The modified polybutadiene polymer of the Example 29 was produced by polymerization and modification in the same manner as in Example 26 except that 162.5 mL of water was added as a reaction inhibitor and stirred for 1 minute at 1000 rpm.

Comparative Example 17

The modified polybutadiene polymer of the Comparative Example 17 was produced by polymerization and modification in the same manner as in Example 26 except that 162.5 mL of water was added as a reaction inhibitor and stirred for 1 minute at 500 rpm.

Comparative Example 18

The modified polybutadiene polymer of the Comparative Example 18 was produced by polymerization and modification in the same manner as in Example 26 except that 195 mL of water was added as a reaction inhibitor and stirred for 1 minute at 700 rpm.

Example 30

The modified polybutadiene polymer of the Example 30 was produced by polymerization and modification in the same manner as in Example 26 except that 8 mL of ethanol was added as a reaction inhibitor and stirred for 1 minute at 700 rpm.

Example 31

The modified polybutadiene polymer of the Example 31 was produced by polymerization and modification in the same manner as in Example 26 except that after 100mL of siloxane was added just before adding a reaction inhibitor in order to lower the solution viscosity and stirring for 1 minute at 700 rpm, 195 mL of water was added as a reaction inhibitor and stirred for 1 minute at 700 rpm.

Comparative Example 19

The modified polybtrtadxene polymer of the Comparative Example 19 was produced by polymerisation and modification in the same manner as in Example 26 except that 162.5 mL of water was added as a reaction Inhibitor and stirred by a propeller type stirring blade for 1 minute at 700 rpm.

These results are shown in the following Table 8. In addition to the polybutadienes of Examples 26-31, Comparative Examples 17-19, a commercial low cis rubber (Diene 55AE: produced, by Asahi Kasei Kogyou Ltd.) and a commercial high cis rubber (UBEPOL BR14H: produced by Ube Industries, Ltd.) were prepared. The properties of these commercial rubbers are also shown similarly in the Table.

TABLE 8

| | | | Example 26 | Example 27 | Example 28 | Example 29 | Comparative Example 17 | Comparative Example 18 |
|---|---|---|---|---|---|---|---|---|
| Termination conditions of reaction | Stirring speed of polymerization inhibiting water | rpm | 700 | 700 | 700 | 1000 | 500 | 700 |
| | Amount of polymerization inhibiting water | vol % | 0.6 | 10 | 12.5 | 12.5 | 12.5 | 15 |
| | | ml | Water 8 ml | Water 130 ml | Water 162.5 ml | Water 162.5 ml | Water 162.5 ml | Water 195 ml |
| | Blade shape | | Helical | Helical | Helical | Helical | Helical | Helical |
| | Solvent dilution | | None | None | None | None | None | None |
| Maximum col length of water particle | | mm | 18.2 | 73.6 | 125.4 | 21.3 | Continuous phase | Continuous phase |
| Solid viscosity | ML | | 40.2 | 39.8 | 39.0 | 41.0 | 47.5 | 44.4 |
| Color | Appearance | | Colorless | Light yellow | Yellow | Light yellow | Dark yellow | Dark yellow |
| | APHA | | 10 | 15 | 20 | 10 | 25 | 25 |
| | YI | | 6.6 | 14.5 | 16.8 | 8.3 | 24.3 | 25.1 |
| Gel | Gel content | wt % | 0.002 | 0.025 | 0.055 | 0.004 | 0.067 | 0.065 |
| Solution viscosity | Tcp | | 108.4 | 103 | 101.4 | 110.4 | 132.1 | 124.3 |
| | Tcp/ML | | 2.7 | 2.6 | 2.6 | 2.7 | 2.8 | 2.8 |
| | Step | | 140.9 | 133.9 | 131.8 | 143.5 | 171.7 | 161.6 |
| Molecular weight | Mn | *10000 | 23.2 | 22.8 | 23.2 | 21.0 | 21.2 | 21.0 |
| | Mw | *10000 | 55.1 | 57.2 | 56.8 | 49.5 | 59.7 | 64.6 |
| | Mw/Mn | | 2.38 | 2.51 | 2.56 | 2.36 | 2.82 | 3.08 |
| Cold flow | CF | mg/min | 25 | 23 | 26 | 26 | 23 | 23 |
| Microstructure | Cis | % | 87.8 | 88.4 | 88.8 | 88.1 | 89 | 88.5 |
| | Vinyl | % | 10.9 | 10.5 | 10.2 | 10.7 | 10 | 10.4 |
| | Trans | % | 1.3 | 1.1 | 1.0 | 1.2 | 1.0 | 1.1 |

| | | | Example 30 | Example 31 | Comparative Example 19 | Low cis | High cis |
|---|---|---|---|---|---|---|---|
| Termination conditions of reaction | Stirring speed of polymerization inhibiting water | | 700 | 700 | 700 | | |
| | Amount of polymerization inhibiting water | | 0.6 | 15 | 12.5 | | |
| | | | Ethanol 8 ml | Water 195 ml | Water 162.5 ml | | |
| | Blade shape | | Helical | Helical | Propeller | | |
| | Solvent dilution | | None | 100 mL of CHx addition | None | | |
| Maximum col length of water particle | | mm | 14.6 | 68.3 | Continuous phase | | |
| Solid viscosity | ML | | 41.7 | 44.5 | 18 | 53.0 | 33.0 |
| Color | Appearance | | Colorless | Light yellow | Dark yellow | Colorless | Colorless |
| | APHA | | 10 | 20 | 25 | 10 | 10 |
| | YI | | 7.2 | 17.8 | 25.2 | | |
| Gel | Gel content | | 0.002 | 0.02 | 0.067 | 0.002 | 0.003 |
| Solution viscosity | Tcp | | 108.4 | 119.6 | 147.9 | 133.0 | 43.0 |
| | Tcp/ML | | 2.6 | 2.7 | 3.1 | 2.6 | 1.3 |
| | Step | | 147.4 | 162.7 | 201.1 | 183.0 | 58.0 |
| Molecular weight | Mn | | 21.9 | 21.8 | 21.3 | 19.4 | 14.7 |
| | Mw | | 50.2 | 57.8 | 62.6 | 16.3 | 10.8 |
| | Mw/Mn | | 2.29 | 2.65 | 2.94 | 2.34 | 2.78 |
| Cold flow | CF | | 27 | 25 | 30 | 22 | 18 |
| Microstructure | Cis | | 87.8 | 88.4 | 89.2 | 37.2 | 97.1 |
| | Vinyl | | 10.9 | 10.5 | 9.7 | 9.4 | 1.1 |
| | Trans | | 1.3 | 1.1 | 1.1 | 63.4 | 1.8 |

As shown in Table 8, the polybutadienes of Examples 26-31 have narrower molecular weight distribution, lower gel content, and lower APHA color than those of Comparative Examples 17-19.

(Production of ABS Polymer (Containing Modified Polybutadiene))

Example 32

Next, the ABS polymer composition of Example 32 was produced using the modified polybutadiene of Example 26. Content of a 1.5-L autoclave provided with a stirrer was purged with nitrogen. 50 g of the modified polybutadiene of Example 26 was dissolved in 372 g of styrene and 90 g of acrylonitrile. Then, 0.1 g of n-dodecyl mercaptan and 0.12 g of t-butylperoxy pivalate were added, followed by stirring at a temperature of 75° C. to conduct prepolymerization for 1.5 hours till 14% of conversion degree of monomer has been achieved. Subsequently, 500 mL of 0.5 wt % aqueous solution of polyvinyl alcohol was poured into the prepolymerization liquid, followed by adding 1.0 g (0.2 weight part) of benzoyl peroxide and 1.0 g (0.2 weight part) of dicumyl peroxide to conduct polymerization continuously during stirring at a temperature of 100° C. for 2 hours and then at a temperature of 125° C. for 2 hours. The polymerization mixture was cooled to a room temperature and filtered to obtain a beads-like polymer, followed by water-washing and drying. The dried matter was subjected to extrusion by extruder to pelletize, thus obtaining an impact resistant ABS polymer. The obtained ABS polymer composition were subjected to injection molding to prepare sample pieces for measurement of physical properties, followed by measuring the physical properties thereof. The results are shown in Table 9.

Example 33

The ABS polymer composition was produced in the same manner as in Example 32 except that the modified polybutadiene of Example 27 was used instead of the modified polybutadiene of Example 26. The physical properties thereof are also shown in Table 9.

Example 34

The ABS polymer composition was produced in the same manner as in Example 32 except that the modified polybutadiene of Example 28 was used instead of the modified polybutadiene of Example 26. The physical properties thereof are also shown in Table 9.

Comparative Examples 20-22

The ABS polymer composition was produced in the same manner as in Example 32 except that the modified polybutadiene of Comparative Example 17, and commercial low cis rubber and high cis rubber were used instead of the modified polybutadiene of Example 26. The physical properties thereof are also shown in Table 9.

TABLE 9

| | | Rubber used | Example 32 Example 26 | Example 33 Example 27 | Example 34 Example 28 | Comparative Example 20 Comparative Example 17 | Comparative Example 21 Low-cis | Comparative Example 22 High-cis |
|---|---|---|---|---|---|---|---|---|
| Pre-polymerized conditions | Stirring speed | rpm | 600 | 600 | 600 | 600 | 600 | 600 |
| Measurement results of physical properties | Volume-average particle diameter | μm | 1.22 | 1.46 | 1.6 | 3.02 | 1.82 | 2.45 |
| | Standard deviation of particle diameter | μm | 1.74 | 2.37 | 2.56 | 2.73 | 2.54 | 2.31 |
| | Number-average particle diameter | μm | 1.05 | 1.14 | 1.2 | 1.46 | 1.1 | 1.35 |
| | Standard deviation of particle diameter | μm | 0.25 | 0.33 | 0.38 | 0.81 | 0.46 | 0.65 |
| | Charpy impact strength | KJ/m$^2$ | 16.4 | 14.1 | 13.8 | 12.7 | 12.3 | 12 |
| | Gross | % | 77 | 63.6 | 58.4 | 32.6 | 37.6 | 44.9 |
| | Tensile strength Yield point | Mpa | 47.9 | 44.7 | 43.5 | 40.6 | 41.2 | 36.5 |
| | Tensile strength Breaking point | Mpa | 39.9 | 37.9 | 37.2 | 35.3 | 36.8 | 37.9 |
| | Graft rate | wt % | 137 | 135 | 145 | 153 | 123 | 122 |
| | Dupont impact strenght | Kg·cm | 45 | 44 | 47 | 41 | 44 | 39 |
| | Swelling degree | wt % | 9 | 7.8 | 8.2 | 8.1 | 9 | 8.8 |
| | Appearance (Fish-eye) | | ○ | ○ | Δ | X | ○ | ○ |
| | Appearance (Hue) | | ○ | ○ | ○ | Δ | ○ | ○ |

Figure 2:
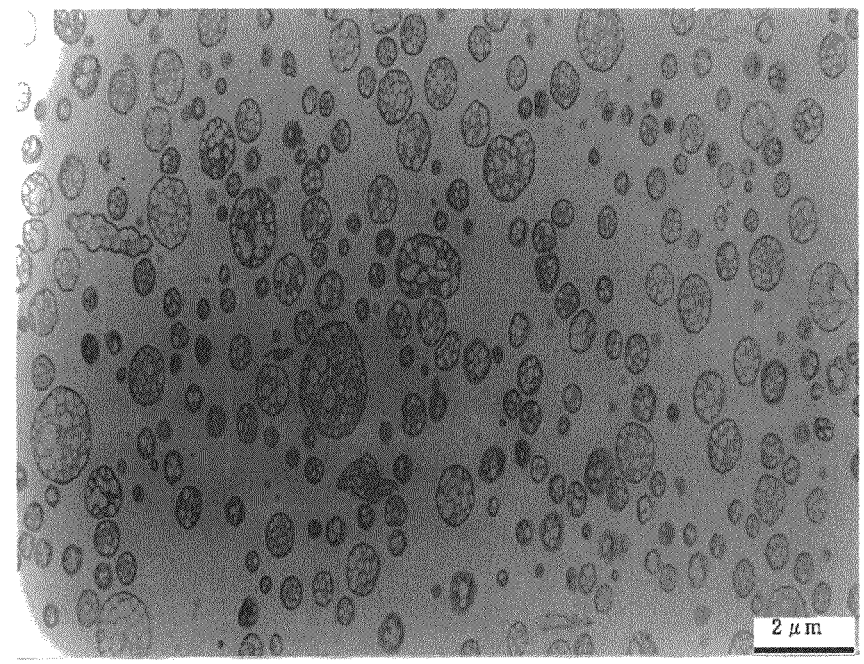
FIG. 2 is a TEM photograph showing the rubber-reinforced styrene resin composition of Example 33.
Figure 3:
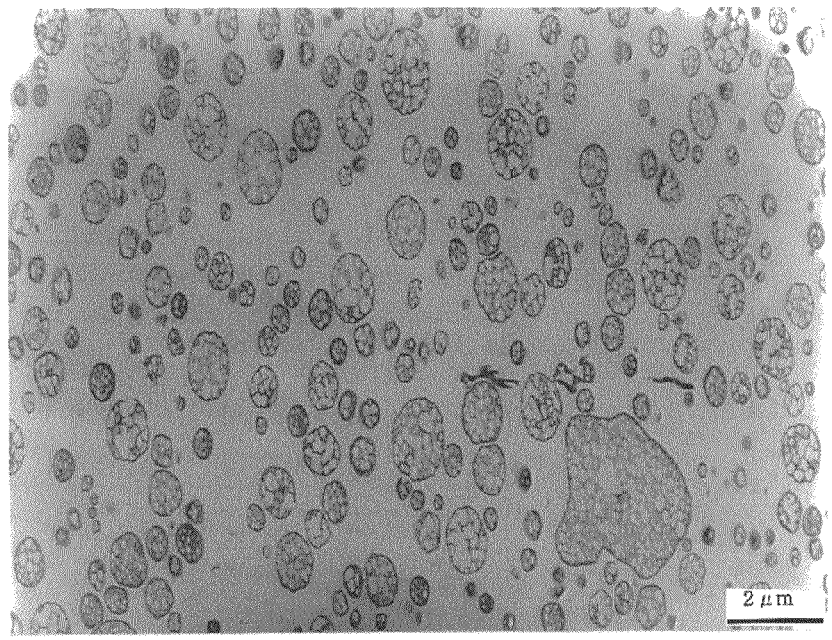
FIG. 3 is a TEM photograph showing the rubber-reinforced styrene resin composition of Example 34.
Figure 4:
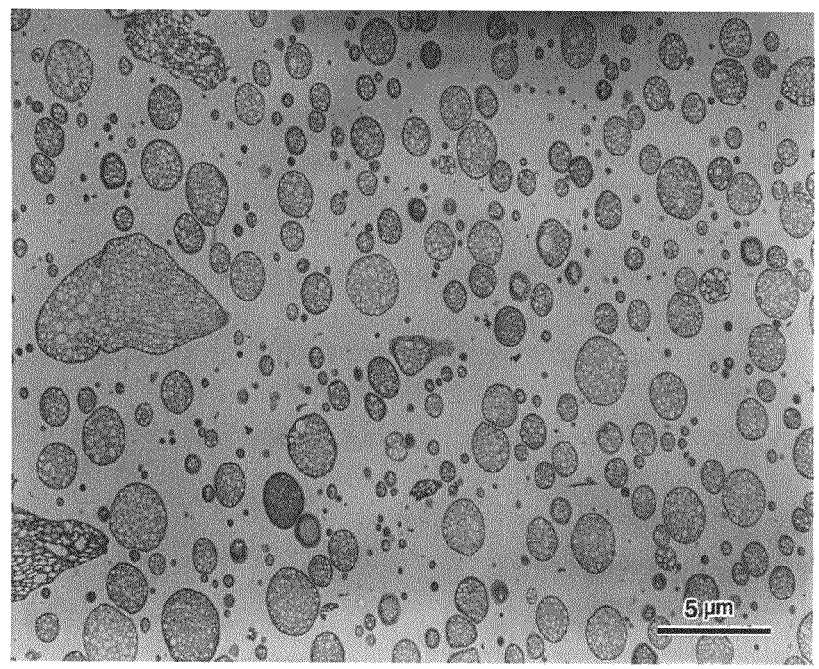
FIG. 4 is a TEM photograph showing the rubber-reinforced styrene resin composition of Comparative Example 20.
Figure 5:
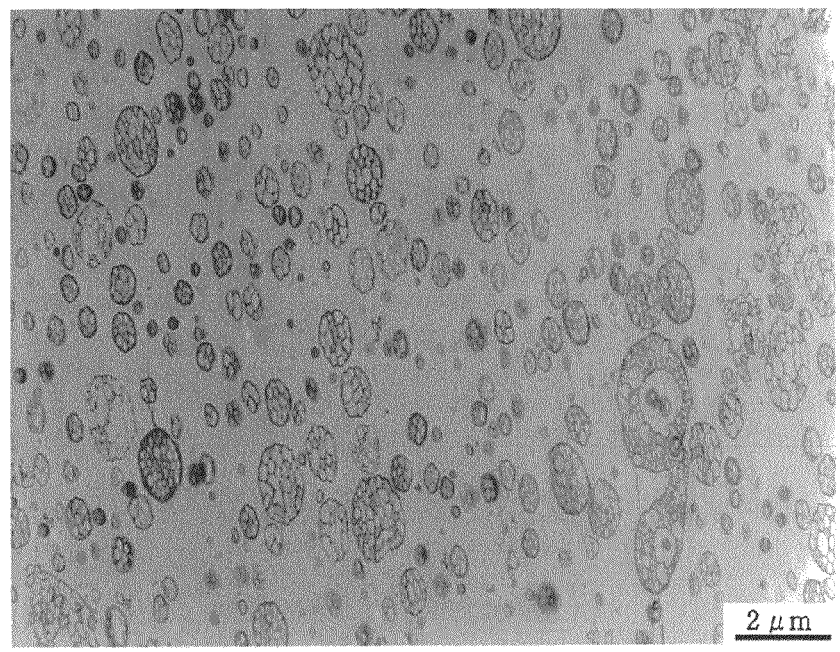
FIG. 5 is a TEM photograph showing the rubber-reinforced styrene resin composition of Comparative Example 21.
Figure 6:
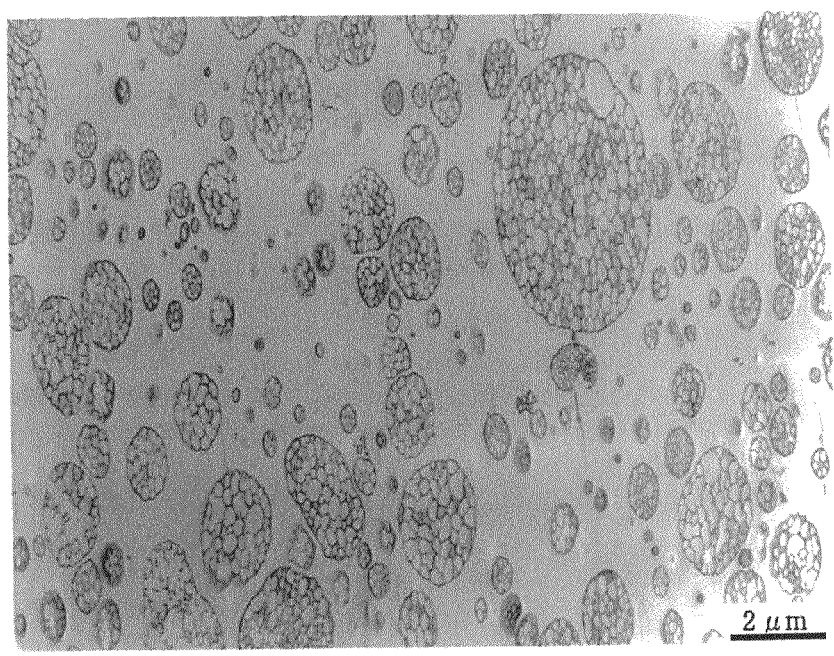
FIG. 6 is a TEM photograph showing the rubber-reinforced styrene resin composition of Comparative Example 22.

As described above, when the sizes of the particles in the ABS polymers obtained by polymerization in the same stirring conditions are compared, it has been found that the ABS polymers of the Examples have small particle diameter and small standard deviation. Namely, the ABS polymer compositions having uniform particle diameter can be obtained. These are estimated from the results of the particle diameters and dispersibility measured by Coulter counter, and observation of TEM shown in FIGS. 1-6. As a result, the ABS polymer compositions of the Examples have a low turbulence of reflective light and very excellent gross. According to reduction of particle size, strengths at a yield point and breaking point have risen. Further, in the Examples, the graft rate to particle diameter is excellent (though ordinarily small diameter of the rubber particles brings about low graft rate, high reactivity beyond ordinary slope is shown.) and the swelling degree is also high. As a result, also the impact strength is excellent. Furthermore, since the APHA color of the polybutadiene can be suppressed, to 20 or less, the appearance of the ABS polymer composition is good. Further, since the polybutadiene having a gel content of 0.06 wt % or less in the Examples is used, the fish-eye of the ABS polymer compositions can be reduced. Namely, the ABS polymer compositions have a high gross, high impact resistance, good appearance (hue), and low fish-eye.

On the other hand, it is generally known that the impact resistant strength to the particle diameter has an optimal point. Since, when the modified polybutadienes of Examples are employed in the same condition (stirring speed), the particle diameter becomes small as compared with those of Comparative Examples, a margin for producing the particles having an objective diameter becomes large, and the optimal particle diameter for the impact resistant strength can be attained with, uniform particle, size at a low rotating speed. This is very advantageous to power of a motor and the like.

Further, since the ABS polymer compositions of the Examples have an increased impact resistant strength, they necessitate smaller amount of rubber as compared with those of the Comparative Examples in order to obtain the same impact resistant strength. Thus, since usage of rubber can be reduced in spite of maintaining the physical properties, it is possible not only to obtain a cost merit, but also to lower the viscosity of rubber-styrene solution and to reduce stirring power because the amount of rubber is low. Further, since the amount of rubber is reduced, the fluidity of the resin is increased to improve the productivity. Reducing the amount of rubber means reducing the number of replacement time of a gel filter in the rubber-dissolving vessel, which is a secondary merit to be enjoyed.

(Production of HIPS Polymer (Containing Modified Polybutadiene))

Example 35

Next, the HIPS polymer composition of Example 35 was produced using the modified polybutadiene of Example 26.

Content of a 1.5-L autoclave provided with a stirrer was purged with nitrogen, 28 g of the modified polybutadiene of Example 26 was dissolved in 372 g of styrene. Then, 0.08 g of n-dodecyl mercaptan was added, followed by stirring at a temperature of 135° C. to conduct prepolymerization for 80 minutes till 30% of conversion degree of monomer has been achieved. Subsequently, 400 mL of 0.5 wt % aqueous solution of polyvinyl alcohol was poured into the prepolymerization liquid, followed by adding 0.8 g of benzoyl peroxide and 0.8 g of dicumyl peroxide to conduct polymerization continuously during stirring at a temperature of 100° C. for 2 hours, at a temperature of 125° C. for 3 hours, and then at a temperature of 140° C. for 2 hours. The polymerization mixture was cooled to a room temperature and filtered to obtain a beads-like polymer, followed by water-washing and drying. The dried matter was subjected to extrusion by extruder to pelletize, thus obtaining an impact resistant HIPS polymer. The obtained HIPS polymer composition were subjected to injection molding to prepare sample pieces for measurement of physical properties, followed by measuring the physical properties thereof. The results are shown in Table 10.

Example 36

The HIPS polymer composition was produced in the same manner as in Example 35 except that the modified polybutadiene of Example 27 was used instead of the modified polybutadiene of Example 26. The physical properties thereof are also shown in Table 10.

Example 37

The HIPS polymer composition was produced in the same manner as in Example 35 except that the modified polybutadiene of Example 28 was used instead of the modified polybutadiene of Example 26. The physical properties thereof are also shown in Table 10.

Comparative Examples 23-25

The HIPS polymer composition was produced in the same manner as in Example 35 except that the modified polybutadiene of Comparative Example 17, and commercial low cis rubber and high cis rubber were used instead of the modified polybutadiene of Example 26. The physical properties thereof are also shown in Table 10.

TABLE 10

| | | | Example 35 | Example 36 | Example 37 | Comparative Example 23 | Comparative Example 24 | Comparative Example 25 |
|---|---|---|---|---|---|---|---|---|
| | | Rubber used | Example 26 | Example 27 | Example 28 | Comparative Example 17 | Low-cis | High-cis |
| Reaction conditions | Stirring speed | rpm | 600 | 600 | 600 | 600 | 600 | 600 |
| Measurement results of physical properties | Volume-average particle diameter | μm | 2.08 | 2.36 | 2.63 | 2.76 | 2.92 | 2.59 |
| | Standard deviation of particle diameter | μm | 0.87 | 1.11 | 1.46 | 1.79 | 1.3 | 1.27 |
| | Number-average particle diameter | $KJ/m^2$ | 1.45 | 1.4 | 1.46 | 1.52 | 1.52 | 1.66 |
| | Standard deviation of particle diameter | % | 0.53 | 0.64 | 0.71 | 0.75 | 0.82 | 0.7 |
| | Charpy impact strength | $KJ/m^2$ | 7.2 | 6 | 5.9 | 5.1 | 6 | 6.5 |
| | Gross | % | 66.5 | 52 | 39.4 | 31.2 | 38.1 | 53.8 |
| | Graft rate | wt % | 285 | 288 | 308 | 295 | 275 | 233 |
| | Dupont impact strenght | Kg·cm | 35 | 34 | 34 | 27 | 31 | 26 |
| | Swelling degree | wt % | 9.7 | 9.5 | 9.5 | 9.3 | 9.2 | 9.9 |
| | Appearance (Fish-eye) | | ○ | ○ | Δ | X | ○ | ○ |
| | Appearance (Hue) | | ○ | ○ | ○ | Δ | ○ | ○ |

Figure 7:
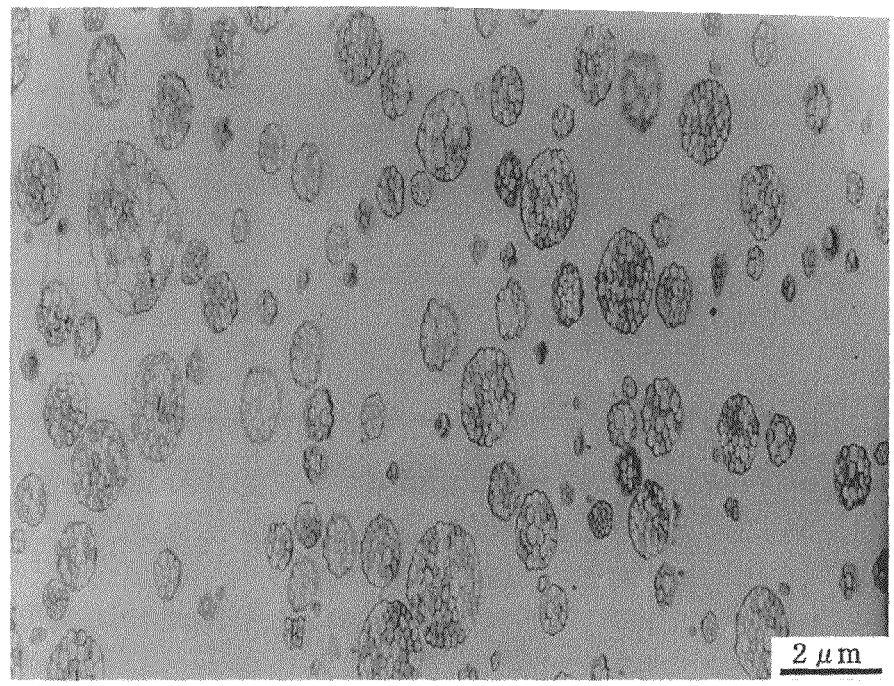
FIG. 7 is a TEM photograph showing the rubber-reinforced styrene resin composition of Example 35.
Figure 8:
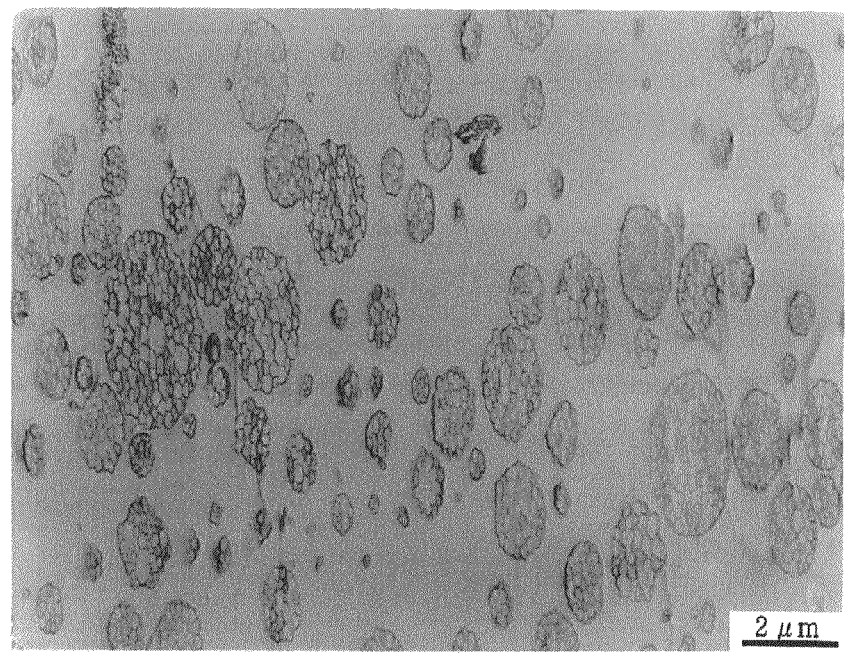
FIG. 8 is a TEM photograph showing the rubber-reinforced styrene resin composition of Example 36.
Figure 9:
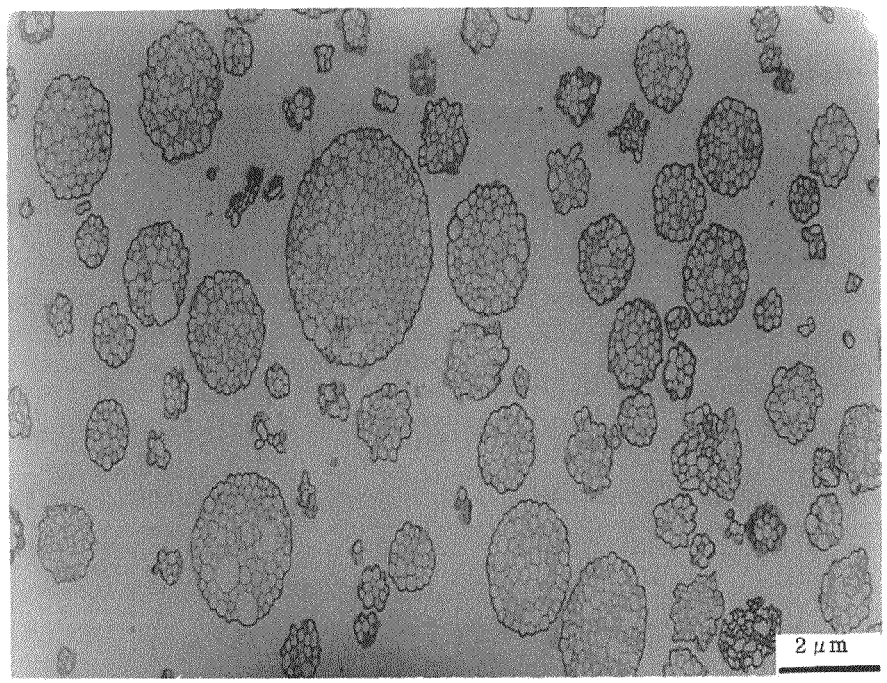
FIG. 9 is a TEM photograph showing the rubber-reinforced styrene resin composition of Example 37.
Figure 10:
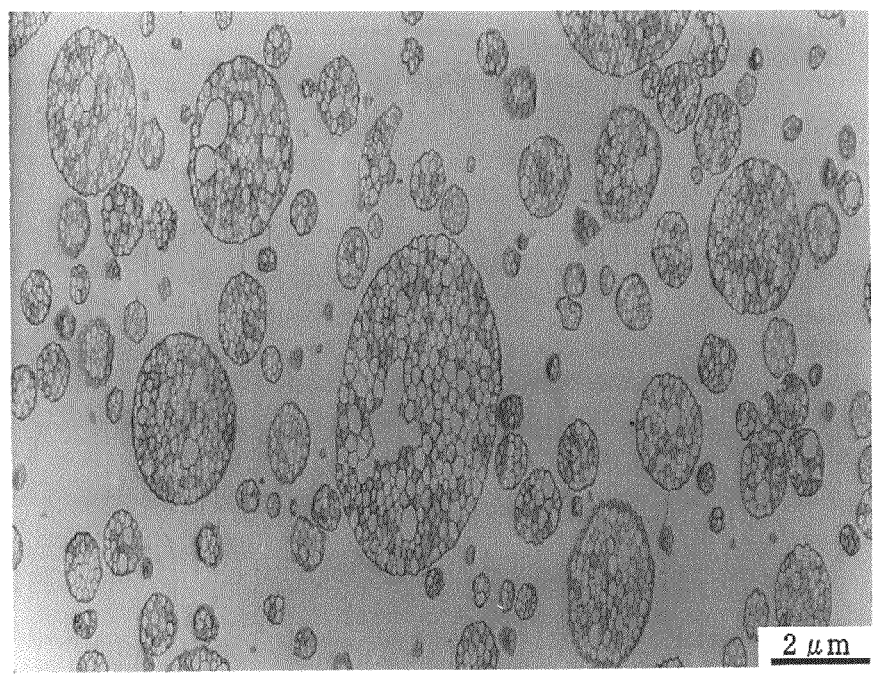
FIG. 10 is a TEM photograph showing the rubber-reinforced styrene resin composition of Comparative Example 23.
Figure 11:
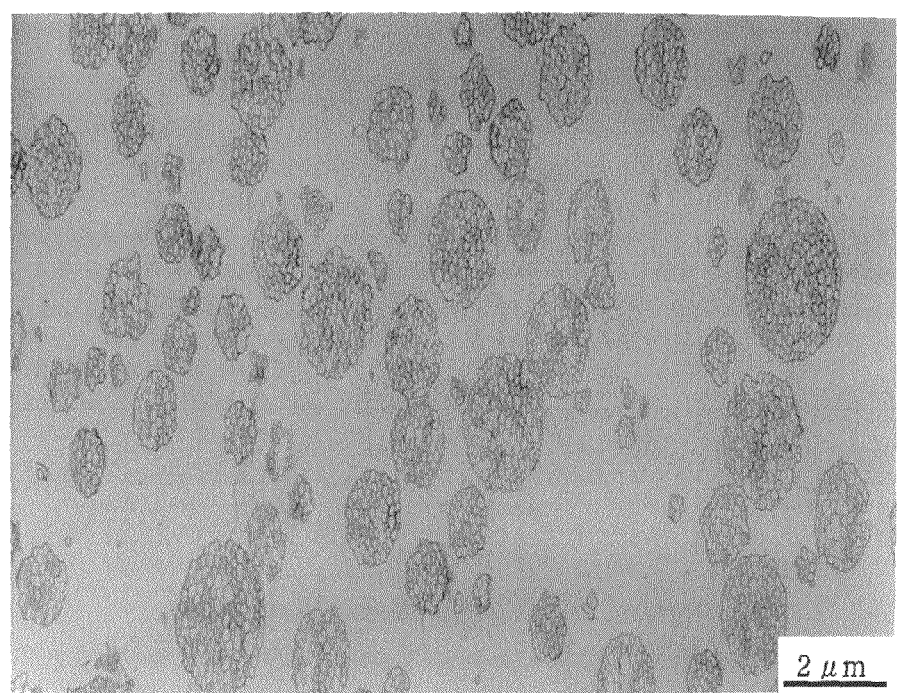
FIG. 11 is a TEM photograph showing the rubber-reinforced styrene resin composition of Comparative Example 25.

As described above, when the sizes of the particles in the HIPS polymer compositions obtained by polymerization in the same stirring conditions are compared, it has been found that the HIPS polymers of Example 35 has the smallest particle diameter and small standard deviation. Namely, the HIPS polymer having uniform particle diameter can be obtained. Uniformity of the particle size is estimated from the results of the particle diameters and dispersibility measured by Coulter counter, and observation of TEM shown in FIGS. 7-11. As a result, the HIPS polymer compositions of the Examples have a low turbulence of reflective light and very excellent gross. Further, in the Examples, the graft rate to particle diameter is excellent (though ordinarily small diameter of the rubber particles brings about low graft rate, high reactivity beyond ordinary slope is shown.) and the swelling degree is also high. As a result, also the impact strength is excellent. Furthermore, since the APHA color of the polybutadiene can be suppressed to 20 or less, the appearance of the HIPS polymer composition is good. Further, since the polybutadiene having a gel content of 0.06 wt. % or less in the Examples is used, the fish-eye of the HIPS polymer compositions can be reduced. Namely, the HIPS polymer compositions have a high gross, high impact resistance, good appearance (hue), and low fish-eye.

On the other hand, it is generally known that the impact resistant strength to the particle diameter has an optimal point. Since, when the modified polybutadienes of Example 26 are employed in the same condition (stirring speed), the particle diameter becomes small as compared with those of Comparative Examples, a margin for producing the particles having an objective diameter becomes large, and the optimal particle diameter for the impact resistant strength can be attained with uniform particle size at a low rotating speed. This is very advantageous to power of a motor and the like.

Further, since the HIPS polymer compositions of the Examples have an increased impact resistant strength, they necessitate smaller amount of rubber as compared with those of the Comparative Examples in order to obtain the same impact resistant strength. Thus, since usage of rubber can be reduced in spite of maintaining the physical properties, it is possible not only to obtain a cost merit, but also to lower the viscosity of rubber-styrene solution and to reduce stirring power because the amount of rubber is low. Further, since the amount of rubber is reduced, the fluidity of the resin is increased to improve the productivity. Reducing the amount of rubber means reducing the number of replacement time of a gel filter in the rubber-dissolving vessel, which is a secondary merit to be enjoyed.

(Production of ABS Polymer (Modified Polybutadiene, ESCR Property))

Synthesis Example 8

Production of Modified Polybutadiene

Content, of a 1.5-L content volume autoclave for polymerization was purged with nitrogen. 1 L of a raw mixed solution (20 wt % of cyclohexane, 40 wt % of butadiene and 40 wt % of butene) was charged in the autoclave, followed by stirring. Then, 19 µL of water was added, followed by stirring for 30 minutes. Then, 110 mL of hydrogen reduced to a volume at 20° C., 1 atm., metered by an integrating mass flow meter, was introduced into the autoclave, followed by adding 1.6 mmol of triethyl aluminum (TEA) and stirring for 5 minutes. Thereafter, 6.8 µmol of vanadiumoxy(cyclopentadienyl)dichloride (CpV(O)Cl$_2$) and 10.2 µmol of triphenylcarbenium tetrakis(pentafluorophenyl)borate (Ph$_3$CB(C$_6$F$_5$)$_4$) were added in order to the toluene solution to conduct polymerization at a polymerization temperature of 50° C. for 30 minutes.

On the other hand, 300 mL of a raw mixed solution (20 wt % of cyclohexane, 40 wt % of butadiene and 40 wt % of butene) was charged in 500-mL autoclave for maturing other than the above-described autoclave for polymerization, followed by adding 16 µL of water and stirring for 30 minutes. Then, 2.2 mmol of diethylaluminum chloride (DEAC) was added, followed by stirring for 3 minute to mature. The matured liquid was pumped to the autoclave for polymerization before termination of polymerization. After pumping and stirring for 1 minute, 1 µmol of cobalt octylate (Co(Oct)$_2$) was added to perform reaction at a temperature of 50° C. for 10 minutes.

After performing reaction, 4,6-bis(octylmethyl)-o-cresol was added, followed by stirring for 1 minute. Then, 8 mL of water was added as a reaction inhibitor, followed by stirring for 1 minute. Thereafter, the mixed solution was dried to evaporate the solvent and water to obtain the modified polybutadiene of Synthesis Example 8.

Synthesis Example 9

The modified polybutadiene of Synthesis Example 9 was obtained by polymerization and modification in the same manner as in Synthesis Example 8 except that 125 mL of hydrogen was added.

Synthesis Example 10

The modified polybutadiene of Synthesis Example 10 was obtained by polymerization and modification in the same manner as in Synthesis Example 8 except, that 130 mL of hydrogen was added.

Synthesis Example 11

The modified polybutadiene of Synthesis Example 11 was obtained by polymerization and modification in the same manner as in Synthesis Example 8 except that 90 mL of hydrogen was added.

Synthesis Example 12

The modified polybutadiene of Synthesis Example 12 was obtained by polymerization and modification in the same manner as in Synthesis Example 8 except that 85 mL of hydrogen was added.

The physical properties including micro-structure of modified polybutadiene of Synthesis Examples 8 to 12, general-purpose low cis polybutadiene (Diene 55AE: produced by Asahi Kasei Corp.), and high cis polybutadiene (trial product: produced by Ube Industries, Ltd.) were shown in Table 11.

TABLE 11

|  |  |  | Synthesis Example 8 | Synthesis Example 9 | Synthesis Example 10 | Synthesis Example 11 | Synthesis Example 12 | Low-cis | High-cis |
|---|---|---|---|---|---|---|---|---|---|
| Mooney viscosity |  | $ML_{1+4,\ 100°\ C.}$ | 45 | 31 | 17 | 52 | 60 | 54 | 33 |
| Microstructure | Cis-1,4-structure | % | 86 | 87 | 87 | 86 | 87 | 37 | 97 |
|  | 1,2-bonded structure | % | 12 | 11 | 11 | 12 | 11 | 9 | 1 |
| 5 wt % styrene solution viscosity (at 25° C.) |  | cp | 161 | 101 | 57 | 213 | 257 | 180 | 58 |
| 5 wt % toluene solution viscosity |  | cp | 118 | 75 | 42 | 157 | 189 | 132 | 43 |

TABLE 11-continued

|  |  |  | Synthesis Example 8 | Synthesis Example 9 | Synthesis Example 10 | Synthesis Example 11 | Synthesis Example 12 | Low-cis | High-cis |
|---|---|---|---|---|---|---|---|---|---|
| (at 25° C.) |  |  |  |  |  |  |  |  |  |
| Molecular weight and molecular weight distribution | Weight-average molecular weight | ×10$^4$ | 50.7 | 48.1 | 34.8 | 58.3 | 62.6 | 43.8 | 40.8 |
|  | Number-average molecular weight | ×10$^4$ | 22.2 | 20.6 | 15.5 | 24 | 27.3 | 19.4 | 14.7 |
|  | molecular weight distribution | Mw/Mn | 2.3 | 2.3 | 2.2 | 2.4 | 2.3 | 2.3 | 2.8 |
| Gel content |  | % | 0.002 | 0.003 | 0 | 0.003 | 0.005 | 0.002 | 0.003 |
| APHA color |  |  | 10 | 15 | 10 | 15 | 15 | 10 | 25 |

Example 38

Next, the ABS polymer composition of Example 38 was produced using the modified polybutadiene of Synthesis Example 8. Content of a 1.5-L autoclave provided with a stirrer was purged with nitrogen. The polybutadiene (50 g) of Synthesis Example 8 was dissolved in styrene (360 g) and acrylonitrile (90 g). Then, 0.1 g of n-dodecyl mercaptan and 0.1 g of t-butylperoxy pivalate were added, followed by stirring at a temperature of 75° C. to conduct, prepolymerization for 90 minutes till 13% of conversion degree of styrene-acrylonitrile copolymer has been achieved. Subsequently, 500 mL of 0.5 wt % aqueous solution of polyvinyl alcohol was poured into the prepolymerization liquid, followed by adding 1.0 g of benzoyl peroxide and 1.0 g of dicumyl peroxide to conduct polymerization continuously during stirring at a temperature, of 100 ° C. for 2 hours, and then at a temperature of 125° C. for 2 hours. The polymerization mixture was cooled to a room temperature and filtered to obtain a beads-like polymer, followed by water-washing and drying. The dried matter was subjected to extrusion by extruder to pelletize, thus obtaining 450 g of ABS polymer. The obtained ABS polymer composition were subjected to injection molding to prepare sample pieces for measurement of physical properties, followed by measuring the physical properties of the sample pieces. The results are shown in Table 12. The tensile properties after evaluation of ESCR are expressed as relative values when the value in Example 1 was taken as 100. The tensile properties after evaluation of ESCR are determined by the product of "tensile elongation" and "tensile elongation retention of after contact, with cyclopentane".

Example 39

The ABS polymer composition was produced in the same manner as in Example 38 except that the raw polybutadiene of Synthesis Example 9 was used.

Example 40

The ABS polymer composition was produced in the same, manner as in Example 38 except that the raw polybutadiene of Synthesis Example 10 was used,

Example 41

The ABS polymer composition was produced in the same manner as in Example 38 except that the raw polybutadiene of Synthesis Example 11 was used.

Example 42

The ABS polymer composition was produced in the same manner as in Example 38 except that the raw polybutadiene of Synthesis Example 12 was used,

Comparative Example 26

The ABS polymer composition was produced in the same manner as in Example 38 except that the low cis rubber shown in Table 11 was used as a raw polybutadiene.

Comparative Example 27

The ABS polymer composition was produced in the same manner as in Example 38 except that the high cis rubber shown in Table 11 was used as a raw polybutadiene.

Example 43

Next, the ABS polymer composition of Example 43 was produced using the modified polybutadiene of Synthesis Example 8. Content of a 1.5-L autoclave provided with a stirrer was purged with nitrogen. 25 g of the polybutadiene of Synthesis Example 8 and 25 g of a general-purpose low cis polybutadiene were dissolved in styrene (360 g) and acrylonitrile (90 g). Then, 0.1 g of n-dodecyl mercaptan and 0.1 g of t-butylperoxy pivalate were added, followed by stirring at a temperature of 75° C. to conduct prepolymerization for 90 minutes till 13% of conversion degree of styrene-acrylonitrile copolymer has been achieved. Subsequently, 500 mL of 0.5 wt. % aqueous solution of polyvinyl alcohol was poured into the prepolymerization liquid, followed by adding 1.0 g of benzoyl peroxide and 1.0 g of dicumyl peroxide to conduct polymerization continuously during stirring at a temperature of 100° C. for 2 hours and then at a temperature of 125° C. for 2 hours. The polymerization mixture was cooled to a room temperature and filtered to obtain a beads-like polymer, followed by water-washing and drying. The dried matter was subjected to extrusion by extruder to pelletize, thus obtaining 450 g of an ABS polymer. The obtained ABS polymers were subjected to injection molding to prepare sample pieces for measurement of physical properties, followed by evaluating the physical properties thereof. The results are shown in Table 12.

Example 44

The ABS polymer composition was produced in the same manner as in Example 43 except that the amount of the modified polybutadiene of Synthesis Example 8 was 37.5 g, and the amount of low cis polybutadiene rubber was 12.5 g.

Example 45

The ABS polymer composition was produced in the same manner as in Example 43 except that the amount of the modified polybutadiene of Synthesis Example 8 was 12.5 g, and the amount, of low cis polybutadiene rubber was 37.5 g.

Example 46

The ABS polymer composition was produced in the same manner as in Example 43 except that a high cis polybutadiene rubber was used as a diene rubber excluding the modified polybutadiene of Synthesis Example 8.

cobalt octylate (Co(Oct)$_2$) was added to perform reaction at a temperature of 50° C. for 10 minutes.

After reaction, 4,6-bis(octylmethyl)-o-cresol was added, followed by stirring for 1 minute. Then, 8 mL of water was added as a reaction inhibitor, followed by stirring for 1

TABLE 12

| | | Rubber used | Example 38 Synthesis Example 8 | Example 39 Synthesis Example 9 | Example 40 Synthesis Example 10 | Example 41 Synthesis Example 11 | Example 42 Synthesis Example 12 | Comparative Example 26 Low cis | Comparative Example 27 High cis | Example 43 Synthesis Example 1/ Low cis | Example 44 Synthesis Example 1/ Low cis | Example 45 Synthesis Example 1/ Low cis | Example 46 Synthesis Example 1/ High cis |
|---|---|---|---|---|---|---|---|---|---|---|---|---|---|
| Rubber amount | | % | 10 | 10 | 10 | 10 | 10 | 10 | 10 | 10 (5/5) | 10(7.5/2.5) | 10(2.5/7.5) | 10 (5/5) |
| Styrene/acrylonitrile ratio | | | 80/20 | 80/20 | 80/20 | 80/20 | 80/20 | 80/20 | 80/20 | 80/20 | 80/20 | 80/20 | 80/20 |
| Graft rate | | % | 159 | 155 | 141 | 154 | 171 | 150 | 135 | 156 | 154 | 155 | 151 |
| Swelling degree | | | 9 | 10 | 9 | 10 | 10 | 9 | 10 | 9 | 10 | 9 | 10 |
| Rubber particle diameter | | μm | 1.5 | 1.6 | 1.3 | 2 | 2 | 2 | 2.2 | 1.7 | 1.6 | 1.7 | 2 |
| Charpy impact strength | | kJ/m$^2$ | 17.1 | 16.4 | 16.5 | 17.2 | 14.9 | 13 | 16.2 | 17.1 | 17.2 | 16.7 | 17 |
| | | INDEX | 100 | 96 | 96 | 101 | 87 | 76 | 95 | | | | |
| Tensile properties | Yield strength | MPa | 44.3 | 43.4 | 50.2 | 47.1 | 42.5 | 47.1 | 45.3 | 49.1 | 48.4 | 49.2 | 47.3 |
| | Tensile strength | MPa | 38 | 38 | 41 | 40 | 39 | 41 | 39.5 | 42.7 | 41.2 | 42 | 42.4 |
| | tensile elongation | % | 32 | 35 | 16 | 31 | 54 | 34 | 36 | 39 | 36 | 35 | 39 |
| | ESCR properties (tensile elongation retention of cyclopentane) | % | 100 | 97 | 100 | 97 | 94 | 91 | 87 | 97 | 100 | 97 | 98 |
| | Tensile properties after ESCR test | INDEX | 100 | | | | | 91 | 98 | 118 | 113 | 106 | 119 |
| Appearance (Hue) | | | ○ | ○ | ○ | ○ | ○ | ○ | Δ | ○ | ○ | ○ | ○ |

(Production of HIPS Polymer (Modified Polybutadiene, ESCR Property))

Synthesis Example 13

Content, of a 1.5-L content volume autoclave for polymerization was purged with nitrogen. 1 L of a raw mixed solution (2.0 wt % of cyclohexane, 40 wt % of butadiene and 40 wt % of butene) was charged in the autoclave, followed by stirring. Then, 19 μL of water was added, followed by stirring for 30 minutes. Then, 120 mL of hydrogen reduced to a volume at 20° C., 1 atm., metered by an integrating mass flow meter, was introduced into the autoclave, followed by adding 1.6 mmol of triethyl aluminum (TEA) and stirring for 5 minutes. Thereafter, 6.8 μmol of vanadiumoxy(cyclopentadienyl)dichloride (CpV(O)Cl$_2$) and 10.2 μmol of triphenylcarbenium tetrakis (pentafluorophenyl)borate (Ph$_3$CB(C$_6$F$_5$)$_4$) were added to the toluene solution to conduct polymerization at a temperature of 50° C. for 30 minutes.

On the other hand, 300 mL of a raw mixed solution (20 wt % of cyclohexane, 40 wt % of butadiene and 40 wt % of butene) was charged in 500-mL content volume autoclave, for maturing other than the above-described autoclave for polymerization, followed by adding 16 μL of water and stirring for 30 minutes. Then, 2.2 mmol of diethyl aluminum chloride (DEAC) was added, followed by stirring for 3 minute to mature. The matured liquid was pumped to the autoclave for polymerization before termination of polymerization. After pumping and stirring for 1 minute, 1 μmol of minute. Thereafter, the mixed solution was dried to evaporate the solvent and water to obtain the modified polybutadiene of Synthesis Example 13.

Synthesis Example 14

The modified polybutadiene of Synthesis Example 14 was obtained by polymerization and modification in the same manner as in Synthesis Example 13 except that 110 mL of hydrogen was added.

Synthesis Example 15

The modified polybutadiene of Synthesis Example 15 was obtained by polymerization and modification in the same manner as in Synthesis Example 13 except, that 90 mL of hydrogen was added.

Synthesis Example 16

The modified polybutadiene of Synthesis Example 16 was obtained by polymerization and modification in the same manner as in Synthesis Example 13 except that 125 mL of hydrogen was added.

Synthesis Example 17

The modified polybutadiene of Synthesis Example 17 was obtained by polymerization and modification in the same manner as in Synthesis Example 13 except, that 85 mL of hydrogen was added.

Synthesis Example 18

The modified polybutadiene of Synthesis Example 18 was obtained by polymerization and modification in the same manner as in Synthesis Example 13 except that 130 mL of hydrogen was added.

Synthesis Example 19

The modified polybutadiene of Synthesis Example 19 was obtained by polymerization and modification in the same manner as in Synthesis Example 13 except that 80 mL of hydrogen was added.

The physical properties including microstructure of modified polybutadiene of Synthesis Example 13-19, general-purpose low cis polybutadiene (Diene 557AE: produced by Asahi Kasei Corp.) and high cis polybutadiene (trial product: produced by Ube Industries, Ltd.) employed for evaluation were shown in Table 13.

HIPS polymers. The obtained HIPS polymer compositions were subjected to Injection molding to prepare sample pieces for measurement of physical properties, followed by measuring the physical, properties thereof. The results are shown in Table 14. The tensile properties after evaluation of ESCR are determined by the product of "tensile elongation" and "tensile elongation retention of after contact with cyclopentane".

Example 48

The HIPS polymer composition was produced in the same manner as in Example 47 except that the raw polybutadiene of Synthesis Example 14 was used.

Example 49

The HIPS polymer composition was produced in the same manner as in Example 47 except that the raw polybutadiene of Synthesis Example 15 was used,

TABLE 13

| | | | Synthesis Example 13 | Synthesis Example 14 | Synthesis Example 15 | Synthesis Example 16 | Synthesis Example 17 | Synthesis Example 18 | Synthesis Example 19 | Low cis | High cis |
|---|---|---|---|---|---|---|---|---|---|---|---|
| Mooney viscosity | | $ML_{1+4, 100° C.}$ | 40 | 45 | 52 | 31 | 60 | 17 | 78 | 54 | 33 |
| Microstructure | Cis-1,4-structure | % | 88 | 86 | 86 | 87 | 87 | 87 | 87 | 37 | 97 |
| | 1,2-bonded structure | % | 11 | 12 | 12 | 11 | 11 | 11 | 11 | 9 | 1 |
| 5 wt % styrene solution viscosity (at 25° C.) | | cp | 143 | 161 | 213 | 101 | 257 | 57 | 405 | 180 | 58 |
| 5 wt % toluene solution viscosity (at 25° C.) | | cp | 105 | 118 | 157 | 75 | 189 | 42 | 298 | 132 | 43 |
| Molecular weight and molecular weight distribution | Weight-average molecular weight | $\times 10^4$ | 55.1 | 50.7 | 58.3 | 48.1 | 62.6 | 34.8 | 73.5 | 43.8 | 40.8 |
| | Number-average molecular weight | $\times 10^4$ | 23.2 | 22.2 | 24.0 | 20.5 | 27.3 | 15.5 | 30.2 | 19.4 | 14.7 |
| | molecular weight distribution | Mw/Mn | 2.4 | 2.3 | 2.4 | 2.3 | 2.3 | 2.2 | 2.4 | 2.3 | 2.8 |
| Gel content | | % | 0.002 | 0.002 | 0.003 | 0.003 | 0.005 | 0.003 | 0.007 | 0.002 | 0.003 |
| APHA color | | | 15 | 10 | 15 | 15 | 15 | 10 | 25 | 10 | 25 |

Example 47

Next, the HIPS polymer composition of Example 47 was produced using the modified polybutadiene of Synthesis Example 13, Content of a 1.5-L autoclave provided with a stirrer was purged with nitrogen. 40 g of the modified polybutadiene of Synthesis Example 13 was dissolved in 360 g of styrene. Then, 0.12 g of n dodecyl mercaptan was added, followed by stirring at a temperature of 135° C. to conduct prepolymerization for 80 minutes till 30% of conversion degree of monomer has been achieved. Subsequently, 400 mL of 0.5 wt % aqueous solution of polyvinyl alcohol was poured into the prepolymerization liquid, followed by adding 0.8 g of benzoyl peroxide and 0.8 g of dicumyl peroxide to conduct polymerization continuously during stirring at a temperature of 100° C. for 2 hours, at a temperature of 125° C. for 3 hours, and then at a temperature of 140° C. for 2 hours. The polymerization mixture was cooled to a room temperature and filtered to obtain a beads-like polymer, followed by water-washing and drying. The dried matter was subjected to extrusion by extruder to pelletize, thus obtaining impact resistant

Example 50

The HIPS polymer composition was produced in the same manner as in Example 47 except that the raw polybutadiene of Synthesis Example 16 was used.

Example 51

The HIPS polymer composition was produced in the same manner as in Example 47 except that the raw polybutadiene of Synthesis Example 17 was used.

Example 52

The HIPS polymer composition was produced in the same manner as in Example 47 except that the raw polybutadiene of Synthesis Example 18 was used.

Comparative Example 28

The HIPS polymer composition was produced in the same manner as in Example 47 except that the raw polybutadiene of Synthesis Example 19 was used.

Comparative Example 29

The HIPS polymer composition was produced in the same manner as in Example 47 except that the low cis polybutadiene shown in Table 13 was used as a raw polybutadiene.

Comparative Example 30

The HIPS polymer composition was produced in the same manner as in Example 47 except that the high cis polybutadiene shown in Table 13 was used as a raw polybutadiene.

Example 53

Next, the HIPS polymer composition of Example 53 was produced using the modified polybutadiene of Synthesis Example 13 and a general-purpose low cis polybutadiene rubber. Content of a 1.5-L autoclave provided with a stirrer was purged with nitrogen. 20 g of the polybutadiene of Synthesis Example 1 and 20 g of general-purpose low cis polybutadiene rubber were dissolved in 360 g of styrene. Then, 0.12 g of n-dodecyl mercaptan was added, followed by stirring at a temperature of 135° C. to conduct prepolymerization for 80 minutes till 30% of conversion degree of monomer has been achieved. Subsequently, 400 mL of 0.5 wt. % aqueous solution of polyvinyl alcohol was poured into the prepolymerization liquid, followed by adding 0.8 g of benzoyl peroxide and 0.8 g of dicumyl peroxide to conduct polymerization continuously during stirring at a temperature of 100° C. for 2 hours, at a temperature of 125° C. for 3 hours, and then at a temperature of 140° C. for 2 hours. The polymerization mixture was cooled to a room temperature and filtered to obtain a beads-like polymer, followed by water-washing and drying. The dried matter was subjected to extrusion by extruder to pelletize, thus obtaining impact resistant HIPS polymers. The obtained HIPS polymers were subjected to injection molding to prepare sample pieces for measurement of physical properties, followed by measuring the physical properties thereof. The results are shown in Table 14.

Example 54

The HIPS polymer was produced in the same manner as in Example 53 except that the amount of the modified polybutadiene of Synthesis Example 13 was 30 g, and the amount of low cis polybutadiene rubber was 10 g.

Example 55

The HIPS polymer was produced in the same manner as in Example 53 except that the amount of the modified polybutadiene of Synthesis Example 13 was 10 g, and the amount of low cis polybutadiene rubber was 30 g.

Example 56

The HIPS polymer was produced in the same manner as in Example 53 except that the high cis polybutadiene rubber was used as a diene rubber excluding the modified polybutadiene of Synthesis Example 13.

TABLE 14

| | | Rubber used | Example 47 Synthesis Example 13 | Example 48 Synthesis Example 14 | Example 49 Synthesis Example 15 | Example 50 Synthesis Example 16 | Example 51 Synthesis Example 17 | Example 52 Synthesis Example 18 | Comparative Example 28 Synthesis Example 19 |
|---|---|---|---|---|---|---|---|---|---|
| Rubber amount | | % | 10 | 10 | 10 | 10 | 10 | 10 | 10 |
| Graft rate | | % | 275 | 283 | 298 | 271 | 295 | 268 | 317 |
| Swelling degree | | | 10 | 10 | 10 | 10 | 10 | 10 | 10 |
| Rubber particle diameter | | µm | 4.7 | 5.1 | 5 | 4 | 7 | 4 | 11.2 |
| Charpy impact strength | | kJ/m$^2$ | 7.1 | 7.2 | 7.1 | 7.2 | 6.6 | 7.2 | 6.3 |
| Tensile properties | Yield strength | MPa | 24.6 | 23.5 | 22.1 | 25.5 | 20.3 | 27.2 | 14.8 |
| | Tensile strength | MPa | 29 | 29 | 29 | 29 | 28 | 29 | 28 |
| | tensile elongation | % | 40 | 40 | 38 | 42 | 35 | 45 | 33 |
| | ESCR properties (tensile elongation retention of cyclopentane) | % | 98 | 98 | 100 | 95 | 94 | 81 | 88 |
| | Tensile properties after ESCR test | INDEX | 100 | | | | | | |
| Appearance (Fish-eye) | | | ○ | ○ | ○ | ○ | ○ | ○ | Δ |
| Appearance (Hue) | | | ○ | ○ | ○ | ○ | ○ | ○ | Δ |

| | | Comparative Example 29 Low cis | Comparative Example 30 High cis | Example 53 Synthesis Example 1/ Low cis | Example 54 Synthesis Example 1/ Low cis | Example 55 Synthesis Example 1/ Low cis | Example 56 Synthesis Example 1/ High cis |
|---|---|---|---|---|---|---|---|
| Rubber amount | | 10 | 10 | 10(5/5) | 10(7.5/2.5) | 10(2.5/7.5) | 10(5/5) |
| Graft rate | | 259 | 218 | 250 | 269 | 267 | 257 |
| Swelling degree | | 9 | 10 | 9 | 9 | 9 | 9 |
| Rubber particle diameter | | 5.5 | 5.6 | 5.1 | 4.9 | 5.2 | 5.5 |
| Charpy impact strength | | 6.5 | 76.9 | | 7.1 | 7.1 | 7.1 |
| Tensile properties | Yield strength | 25 | 24.5 | 27.2 | 26.5 | 27.3 | 25.8 |
| | Tensile strength | 29.3 | 26.3 | 31.6 | 31.2 | 31.4 | 30.4 |
| | tensile elongation | 37 | 36 | 45 | 45 | 46 | 45 |
| | ESCR properties (tensile elongation retention of cyclopentane) | 81 | 89 | 93 | 96 | 96 | 91 |

TABLE 14-continued

| | | | | | | |
|---|---|---|---|---|---|---|
| Tensile properties after ESCR test | 77 | 62 | 110 | 110 | 113 | 105 |
| Appearance (Fish-eye) | ○ | ○ | ○ | ○ | ○ | ○ |
| Appearance (Hue) | ○ | Δ | ○ | ○ | ○ | ○ |

What is claimed is:

1. A polybutadiene characterized in that (1) content of 1,2-structure in the polybutadiene is 4 to 30%, (2) content of cis-1,4-structure in the polybutadiene is 65 to 95%, and (3) content of trans-1,4-structure in the polybutadiene is 5% or less, a ratio ($Tcp/ML_{1+4}$) of a 5% toluene solution viscosity (Tcp) measured at 25° C. and a Mooney viscosity ($ML_{1+4}$) at 100° C. is 2.0 or higher, a molecular weight distribution (Mw/Mn) is 2.80 or less, a gel content is 0.06 wt % or less, and an APHA color is 20 or less, wherein the polybutadiene is a product produced by a polymerization process in which a polymerization inhibitor is added to a polybutadiene solution, thereby to stop a polymerization in a stirring state where polymerization inhibitor particles each having a particle size of 135 mm or less are dispersed in the polybutadiene solution.

2. The polybutadiene according to claim 1, characterized in that the polybutadiene is a product produced by using a catalyst comprising (A) metallocene type complex of transition metal compound, and (B) an ionic compound of non-coordinate anion and cation and/or alumoxanes.

3. The polybutadiene according to claim 1, characterized in that the polybutadiene is a product produced by using a catalyst comprising (A) metallocene type complex of transition metal compound, (B) an ionic compound of non-coordinate anion and cation, (C) an organometallic compound of group 1-3 element of the periodic table, and (D) water.

4. The polybutadiene of claim 1, wherein the polybutadiene has a yellow index of 23 or less.

5. The polybutadiene of claim 4, wherein the polybutadiene has a cold flow rate of 50 mg/min or less.

6. The polybutadiene of claim 1, wherein the polybutadiene has a cold flow rate of 50 mg/min or less.

* * * * *